US012101433B2

(12) United States Patent
Kahn

(10) Patent No.: US 12,101,433 B2
(45) Date of Patent: Sep. 24, 2024

(54) NETWORK EXCEPTION SYSTEMS AND METHODS FOR PACKET-SWITCHED TELEPHONY

(71) Applicant: Ari Kahn, Mount Shasta, CA (US)

(72) Inventor: Ari Kahn, Mount Shasta, CA (US)

(73) Assignee: STARLOGIK IP LLC, New York, NY (US)

( * ) Notice: Subject to any disclaimer, the term of this patent is extended or adjusted under 35 U.S.C. 154(b) by 0 days.

(21) Appl. No.: 17/173,756

(22) Filed: Feb. 11, 2021

(65) Prior Publication Data
US 2022/0256039 A1    Aug. 11, 2022

(51) Int. Cl.
*H04M 11/00* (2006.01)
*H04L 12/44* (2006.01)
(Continued)

(52) U.S. Cl.
CPC .......... *H04M 15/18* (2013.01); *H04L 12/44* (2013.01); *H04L 65/1033* (2013.01); *H04L 65/1046* (2013.01); *H04L 65/1104* (2022.05); *H04M 1/66* (2013.01); *H04M 7/0066* (2013.01); *H04M 7/0078* (2013.01); *H04M 15/751* (2013.01); *H04M 2203/15* (2013.01);
(Continued)

(58) Field of Classification Search
CPC ...... H04M 15/18; H04M 1/66; H04M 7/0066; H04M 7/0078; H04M 15/751; H04M 2203/15; H04M 2203/158; H04M 2203/551; H04M 2215/202; H04M 2215/26; H04M 2215/7209; H04Q 2213/152; H04L 12/44; H04L 65/1033; H04L 65/1046; H04L 65/1104
See application file for complete search history.

(56) References Cited

U.S. PATENT DOCUMENTS 5,487,111 A * 1/1996 Slusky .................... H04M 3/46
379/88.01
6,029,062 A * 2/2000 Hanson ................. H04M 17/20
455/408

(Continued)

FOREIGN PATENT DOCUMENTS

EP         2609726 B1     9/2014
KR    20020022534 A  *  9/2000    ............. G06Q 20/28

*Primary Examiner* — Stephen M D Agosta
(74) *Attorney, Agent, or Firm* — Greenberg Traurig

(57) ABSTRACT

Asynchronous and/or synchronous telephony protocol systems and methods may include an asynchronous signaling node (ASN) and/or a call duration time quota from a charging onset to place and complete a call based on a first device call request as received from a first user mobile device on a packet switched network. The asynchronous systems include instructions to automatically modify the telephony address with a prefix and destination address when the first device has insufficient or independent balance or upon a network exception; route the modified call signal to the ASN; and deliver and automatically disconnect the call when the call is completed. The synchronous systems are balance-independent and include instructions to automatically set the call duration time quota upon such exception, and deliver and automatically disconnect the call from the second user telephony device when the call is completed or when the call duration time quota is exceeded.

13 Claims, 10 Drawing Sheets

(51) Int. Cl.
*H04L 65/1033* (2022.01)
*H04L 65/1046* (2022.01)
*H04L 65/1104* (2022.01)
*H04M 1/66* (2006.01)
*H04M 7/00* (2006.01)
*H04M 15/18* (2006.01)
*H04M 15/00* (2006.01)

(52) U.S. Cl.
CPC ............. *H04M 2203/158* (2013.01); *H04M 2203/551* (2013.01); *H04M 2215/202* (2013.01); *H04M 2215/26* (2013.01); *H04M 2215/7209* (2013.01); *H04Q 2213/152* (2013.01)

(56) References Cited

U.S. PATENT DOCUMENTS

| | | | | |
|---|---|---|---|---|
| 6,870,827 B1* | 3/2005 | Voit | | H04L 65/752 370/352 |
| 6,992,974 B1* | 1/2006 | Tripathi | | H04L 69/40 370/216 |
| 7,995,464 B1* | 8/2011 | Croak | | H04L 41/5009 709/239 |
| 8,111,649 B1* | 2/2012 | Agarwall | | H04L 12/00 370/328 |
| 8,417,224 B1* | 4/2013 | Young | | H04M 3/53333 455/414.1 |
| 8,681,633 B1* | 3/2014 | Croak | | H04L 65/1104 370/238 |
| 8,711,680 B2* | 4/2014 | Croak | | H04L 45/00 370/221 |
| 8,792,118 B2* | 7/2014 | Vendrow | | H04N 1/0022 358/1.15 |
| 8,838,082 B2* | 9/2014 | Vendrow | | H04W 4/02 455/456.1 |
| 10,187,528 B2 | 1/2019 | Kahn | | |
| 10,277,751 B2* | 4/2019 | Jonas | | H04M 17/20 |
| 10,715,971 B2* | 7/2020 | Ben Arzi | | H04W 4/16 |
| 2001/0005358 A1* | 6/2001 | Shiozawa | | H04L 45/00 370/389 |
| 2004/0001474 A1* | 1/2004 | Simelius | | H04W 76/22 455/442 |
| 2004/0123221 A1* | 6/2004 | Huffman | | H03M 13/093 714/776 |
| 2005/0013242 A1* | 1/2005 | Chen | | H04L 45/04 370/244 |
| 2005/0243725 A1* | 11/2005 | Wrenn | | H04L 69/40 370/238 |
| 2006/0031519 A1* | 2/2006 | Helliwell | | H04L 67/2876 709/227 |
| 2006/0187817 A1* | 8/2006 | Charzinski | | H04L 45/28 370/242 |
| 2006/0215543 A1* | 9/2006 | Croak | | H04L 65/80 370/216 |
| 2007/0168428 A1* | 7/2007 | Clift | | H04M 3/53316 709/206 |
| 2007/0224969 A1* | 9/2007 | Rao | | H04W 12/06 455/411 |
| 2008/0108333 A1* | 5/2008 | Jemison | | H04W 88/18 455/433 |
| 2009/0149159 A1* | 6/2009 | Han | | H04Q 3/0045 455/414.1 |
| 2009/0177481 A1* | 7/2009 | Curtin | | G06Q 30/02 705/346 |
| 2010/0111002 A1* | 5/2010 | Xu | | H04M 3/4288 370/352 |
| 2010/0202455 A1* | 8/2010 | Sundaram | | H04L 63/0428 455/435.1 |
| 2010/0250680 A1* | 9/2010 | Bhatt | | H04W 4/14 709/206 |
| 2010/0284335 A1* | 11/2010 | Raty | | H04M 3/42 370/328 |
| 2011/0045818 A1* | 2/2011 | Banks | | H04W 4/14 455/422.1 |
| 2011/0081011 A1* | 4/2011 | Gavita | | H04M 3/42102 379/201.02 |
| 2012/0307987 A1* | 12/2012 | Croak | | H04L 65/1069 379/90.01 |
| 2013/0011132 A1* | 1/2013 | Blair | | H04L 12/4641 398/58 |
| 2013/0142511 A1* | 6/2013 | Spraggs | | H04J 14/0267 398/51 |
| 2014/0286251 A1* | 9/2014 | Kohli | | H04W 24/04 370/329 |
| 2016/0241461 A1* | 8/2016 | Enyedi | | H04L 45/50 |
| 2017/0156043 A1* | 6/2017 | Li | | H04W 76/11 |
| 2017/0331946 A1* | 11/2017 | Mumick | | H04M 15/08 |
| 2018/0007197 A1* | 1/2018 | Giatilis | | H04M 3/42059 |
| 2018/0124124 A1 | 5/2018 | Corona et al. | | |
| 2018/0359367 A1* | 12/2018 | Jonas | | H04M 15/88 |
| 2021/0105866 A1* | 4/2021 | Kavuri | | H04W 8/183 |
| 2022/0030398 A1* | 1/2022 | Kahn | | H04M 15/8055 |
| 2022/0256040 A1* | 8/2022 | Kahn | | H04M 15/772 |

\* cited by examiner

NETWORK EXCEPTION SYSTEMS AND METHODS FOR PACKET-SWITCHED TELEPHONY

TECHNICAL FIELD

IP Multimedia Subsystem (IMS) and Voice over Long-Term Evolution (VoLTE) packet switching systems are disclosed. Also disclosed are systems and methods for IMS and VoLTE packet switching and servicing callers who have an insufficient account balance, and servicing callers independent of their account balance. While IMS and VoLTE may be one and the same network, they may be distinct networks, and are herein referenced in a non-limiting scope. A portion of the disclosure of this patent document contains material subject to copyright protection. The copyright owner has no objection to the facsimile reproduction by anyone of the patent document or the patent disclosure, as it appears in Patent and Trademark Office patent file or records, but otherwise reserves all copyright rights whatsoever.

BACKGROUND

Some users of modern prepaid mobile calling systems are without credit, or they lack sufficient credit to place a call. They might have insufficient resources to pay for or establish credit for telecommunications services, or to fund an account balance sufficient to place calls. Many users find the cost of access to such mobile calling systems prohibitive. A need exists for alternative mobile calling systems to provide access to such users.

SUMMARY

In one embodiment, a zero charge telephony protocol system includes one or more processors, a non-transitory memory communicatively coupled to the one or more processors, and machine readable instructions. The machine readable instructions are stored in the non-transitory memory and cause the system to perform at least the following when executed by the one or more processors: receive a call signal from a first user mobile device on a packet switched network and associated with a first user account, which signal comprises a request to place and complete a call to a telephony address of a second user telephony device; and automatically modify the telephony address with a distinguishing service code prefix and an asynchronous signaling switch destination address to generate a modified call signal comprising a modified address, including the distinguishing service code prefix and the asynchronous signaling switch destination address, when the first user account (i) has insufficient balance to complete the call or (ii) is independent of balance such that first user mobile device is configured to transmit the call signal comprising the request to place and complete the call independent of balance. The instructions further cause the system to perform the following when executed by the one or more processors: route the modified call signal, via the packet switched network, to an asynchronous signaling switch based on the asynchronous signaling switch destination address associated with the modified address; revert the modified call signal at the asynchronous signaling switch to the call signal; deliver the call signal from the asynchronous signaling switch to the second user telephony device to complete the call; and automatically disconnect the call from the second user telephony device by the asynchronous signaling switch.

In another embodiment, a method of implementing a zero charge telephony protocol includes receiving, from a first user mobile device on a packet switched network and associated with a first user account, a call signal comprising a request to place and complete a call to a telephony address of a second user telephony device; and automatically modifying the telephony address with a distinguishing service code prefix and an asynchronous signaling switch destination address to generate a modified call signal comprising a modified address, including the distinguishing service code prefix and the asynchronous signaling switch destination address when: 1) the first user's account balance is insufficient to complete the call; or 2) under conditions independent of the first user's account balance such that first user mobile device is configured to transmit the call signal comprising the request to place and complete the call independent of balance. The method further includes routing the modified call signal, via the packet switched network, to an asynchronous signaling switch based on the asynchronous signaling switch destination address associated with the modified address; reverting the modified call signal at the asynchronous signaling switch to the call signal; delivering the call signal from the asynchronous signaling switch to the second user telephony device to complete the call; and automatically disconnecting the call from the second user telephony device by the asynchronous signaling switch.

In another embodiment, a zero charge telephony protocol system includes one or more processors, a non-transitory memory communicatively coupled to the one or more processors, machine readable instructions stored in the non-transitory memory that cause the system to perform at least the following when executed by the one or more processors: receive, from a first user mobile device on a packet switched network and associated with a first user account, a call signal comprising a request to place and complete a call to a telephony address of a second user telephony device, wherein the first user mobile device is associated with a balance-independent subscriber identification module (SIM) card. The instructions further cause the system to perform the following when executed by the one or more processors: automatically set a duration time quota when the first user account has insufficient balance to complete the call and based on using the balance-independent SIM card; deliver the call signal to the second user telephony device to complete the call; and automatically disconnect the call from the second user telephony device when the call signal has been delivered or when the duration time quota is exceeded after a charging onset is encountered.

In one other embodiment, a telephony protocol system includes a network exception handler including logic to handle a network exception, one or more processors, a non-transitory memory including the network exception handler and communicatively coupled to the one or more processors, and machine readable instructions. The machine readable instructions are stored in the non-transitory memory and cause the system to perform at least the following when executed by the one or more processors: receive a call signal from a first user mobile device on a packet switched network and associated with a first user account, which signal comprises a request to place and complete a call to a telephony address of a second user telephony device; and automatically modify the telephony address with a distinguishing service code prefix and an asynchronous signaling switch destination address to generate a modified call signal comprising a modified address, including the distinguishing service code prefix and the asynchronous signaling switch destination address, when the network exception prevents completion of the call to the second user telephony device. The instructions further cause the system to perform the following when executed by the one or more processors: route the modified call signal, via the packet switched network, to an asynchronous signaling switch based on the asynchronous signaling switch destination address associated with the modified address; revert the modified call signal at the asynchronous signaling switch to the call signal; deliver the call signal from the asynchronous signaling switch to the second user telephony device to complete the call; and automatically disconnect the call from the second user telephony device by the asynchronous signaling switch.

In another embodiment, a method of implementing a telephony protocol includes receiving, from a first user mobile device on a packet switched network and associated with a first user account, a call signal comprising a request to place and complete a call to a telephony address of a second user telephony device; and automatically modifying the telephony address with a distinguishing service code prefix and an asynchronous signaling switch destination address to generate a modified call signal comprising a modified address, including the distinguishing service code prefix and the asynchronous signaling switch destination address when a network exception prevents completion of the call to the second user telephony device. The method further includes routing the modified call signal, via the packet switched network, to an asynchronous signaling switch based on the asynchronous signaling switch destination address associated with the modified address; reverting the modified call signal at the asynchronous signaling switch to the call signal; delivering the call signal from the asynchronous signaling switch to the second user telephony device to complete the call; and automatically disconnecting the call from the second user telephony device by the asynchronous signaling switch.

In another embodiment, a telephony protocol system includes a network exception handler including logic to handle a network exception, one or more processors, a non-transitory memory including the network exception handler and communicatively coupled to the one or more processors, machine readable instructions stored in the non-transitory memory that cause the system to perform at least the following when executed by the one or more processors: receive, from a first user mobile device on a packet switched network and associated with a first user account, a call signal comprising a request to place and complete a call to a telephony address of a second user telephony device, wherein the first user mobile device is associated with a balance-independent subscriber identification module (SIM) card. The instructions further cause the system to perform the following when executed by the one or more processors: automatically set a duration time quota when the network exception prevents completion of the call to the second user telephony device and based on using the balance-independent SIM card; deliver the call signal to the second user telephony device to complete the call; and automatically disconnect the call from the second user telephony device when the call signal is delivered or the duration time quota is exceeded after a charging onset.

These and additional embodiments and features are more fully described in the following detailed description in combination with the drawings.

BRIEF DESCRIPTION OF THE DRAWINGS

Embodiments illustrated in the drawings are merely exemplary, and do not limit the present disclosure. The following detailed description of illustrative embodiments is to be considered in combination with the drawings, where like structure is indicated with like reference numerals, and in which.

DETAILED DESCRIPTION

Embodiments disclosed involve technology for cellular call access and related mobile calling systems with at least a packet-switching origination source on a packet switched network such as IMS VoLTE. These may be configured to interact with a smart mobile device of a user, for instance. The term "interact" or "interaction" as used here describes an electronic communication including a transmission and reception of electronic data signals directly or indirectly between at least two electronic devices, such as through wired or wireless electronic communication networks. Various autonomous navigation methods and systems are described in more detail herein with specific reference to the drawings.

Figure 1A:
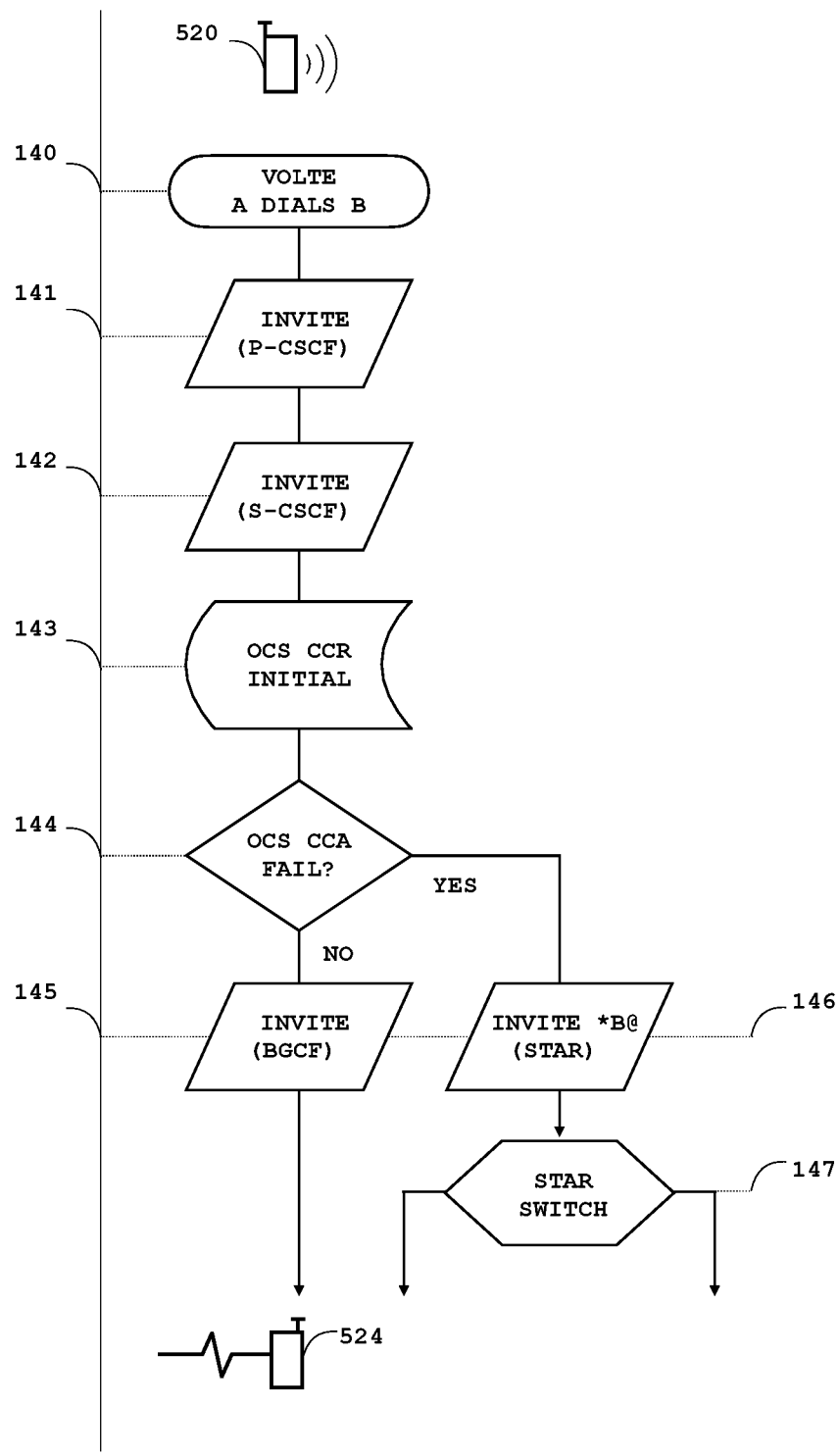
FIG. 1A schematically depicts a flowchart of a method for a zero charge subscriber identification module (SIM) card system on an asynchronous zero charge telephony protocol system and a balance-dependent (e.g., prepaid) SIM card associated with a first user IMS mobile device, according to one or more embodiments shown and described herein.
Figure 1B:
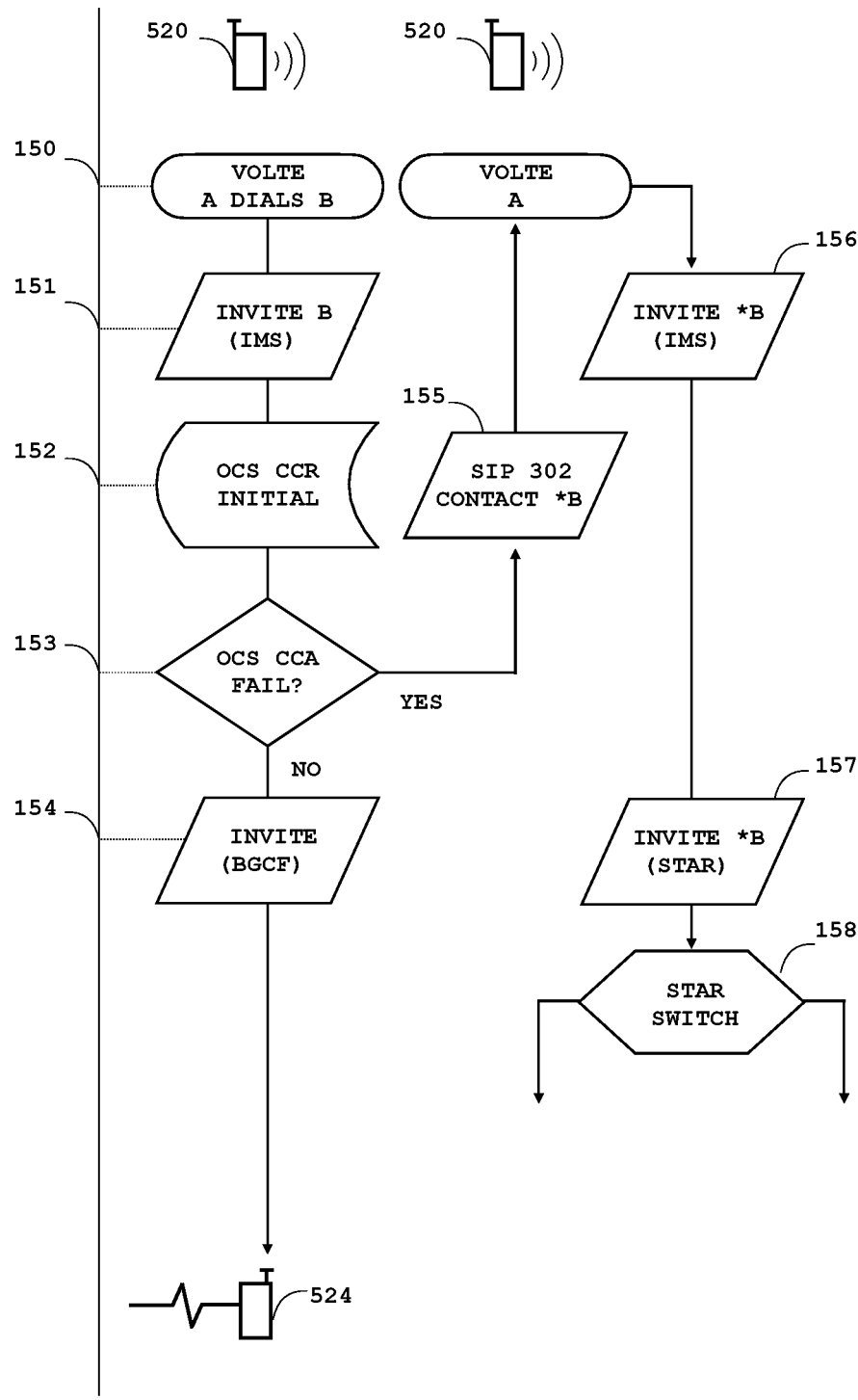
FIG. 1B schematically depicts a flowchart of another method for a zero charge subscriber identification module (SIM) card system on an asynchronous zero charge telephony protocol system and a balance-dependent (e.g., prepaid) SIM card associated with a first user IMS mobile device that may transmit a modified call signal request, according to one or more embodiments shown and described herein.
Figure 2:
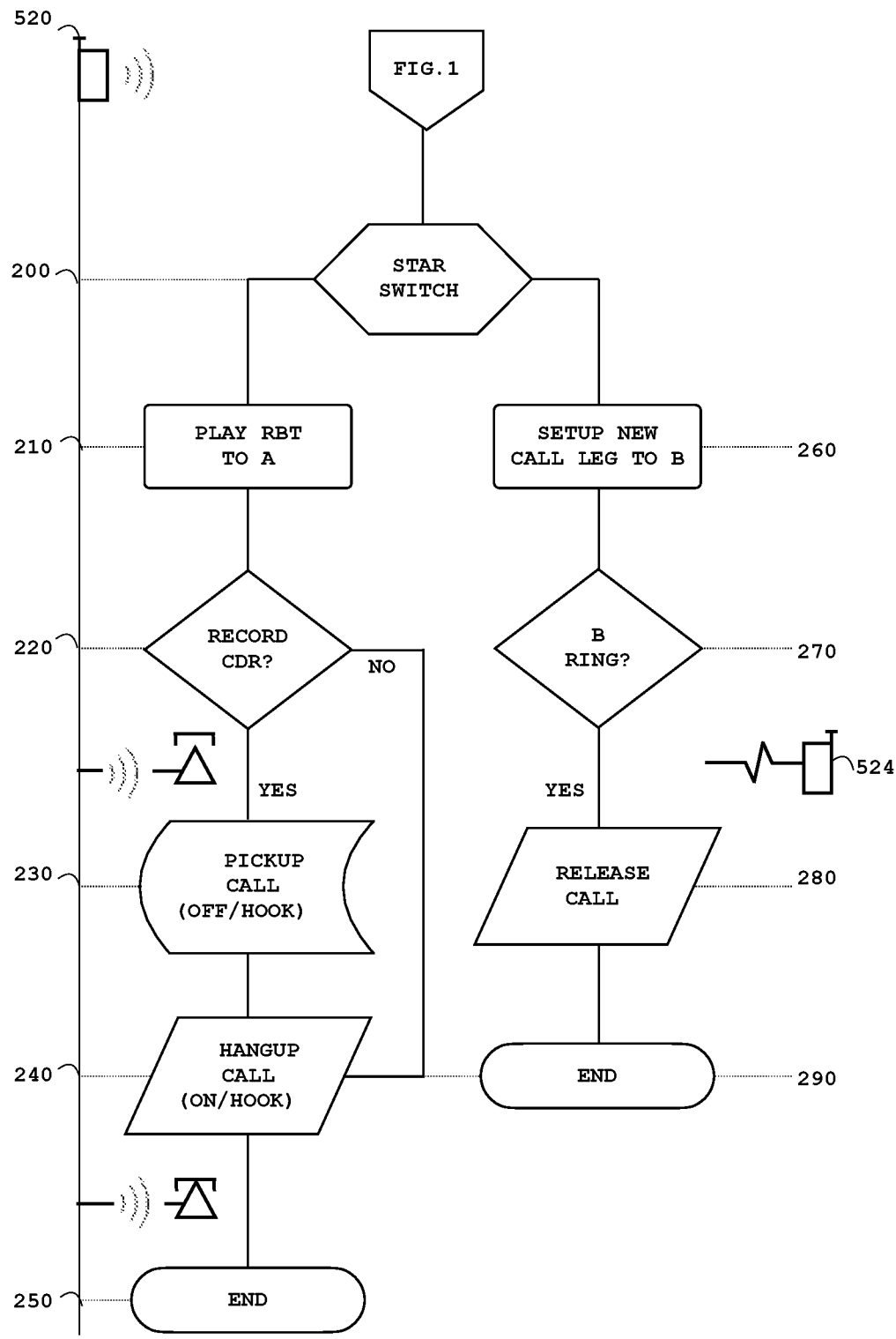
FIG. 2 schematically depicts a flowchart of a method for continuing the method of FIG. 1A or FIG. 1B, according to one or more embodiments shown and described herein.
Figure 5:
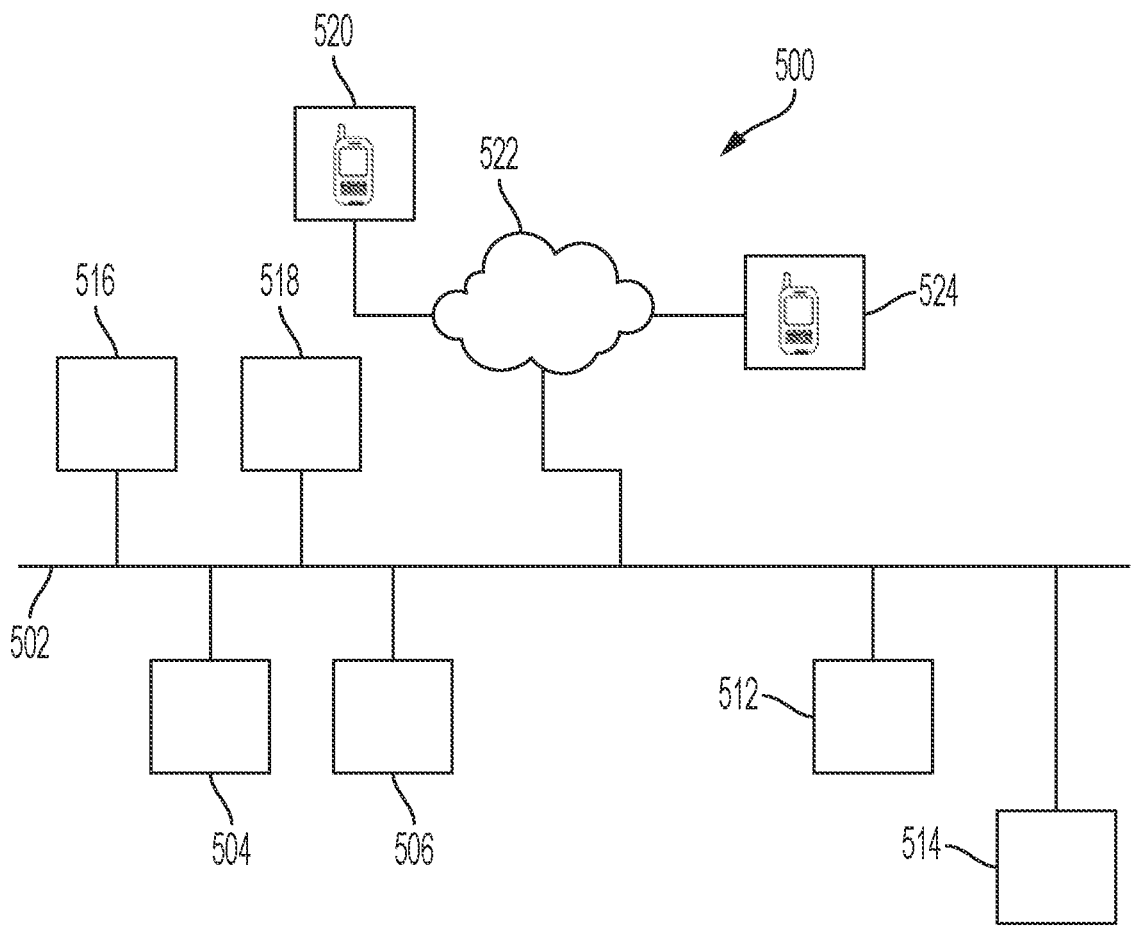
FIG. 5 schematically depicts a system for implementing computer and software based methods for the zero charge telephony protocols, according to one or more embodiments shown and described herein.

As described below, the mobile calling systems and methods provide an asynchronous (FIGS. 1A-3D) or synchronous (FIG. 3E) calling scheme between a first user mobile device 520 of a first user, a second user telephony device 524 of a second user (as shown in FIGS. 2 and 5 and that may be a mobile device or a fixed line telephony device), and a switching node as a switch component 512 (as shown in FIG. 5) such that the first user mobile device is not charged for placing and momentarily completing a call to the second user telephony device through use of a customized connection logic. Exemplary embodiments are described in U.S. patent application Ser. No. 16/997, 418, filed on Aug. 19, 2020, which is incorporated by reference in its entirety herein. The present disclosure further describes embodiments and associated telephony protocols in which at least the first user mobile device 520 is an originating device on a packet-switching network such as IMS VoLTE. An embodiment of the switch component 512 is shown as "Star Switch" based on a star symbol distinguishing service code prefix and an asynchronous signaling switch destination address in FIGS. 1A, 1B, and 2, and will be described in greater detail below. Reference to "Star Switch" may be similarly applied to other embodiments of the switch component 512 based on a distinguishing service code prefix other than a star symbol distinguishing service code prefix.

In one embodiment, the telecommunications network may be a packet switched network supporting Session Initiation Protocol (SIP) User Equipment (UE). The packet switched network may be IMS VoLTE or other suitable packet switched networks that move data in separate data packets based on a destination address to transmit a message. SIP is a signaling protocol to initiate, maintain, and terminate real-time multi-media (e.g., voice, video, and/or messaging) sessions for internet telephony applications and/or instant messaging over Internet Protocol (IP) networks and/or voice over IP (VOIP) networks. UE may include smart or otherwise network connected devices, such as the first user mobile device 520 described herein. The embodiments described herein may be based on the packet switched network and/or may be integrated with a circuit switched network based on dedicated point to point connections for calls, as described in greater detail below.

Referring to FIGS. 1A and 1B, the prefixing, routing, and switching scheme for the zero charge SIM card system that may be used with either FIG. 1A or FIG. 1B methodologies includes a respective flow item 140, 150, in which user A dials or otherwise inputs, through the first user mobile device 520 on a packet switching network, a telephony address of the second user telephony device 524 of user B to generate a call setup request between user A and user B. The telephony address may be a Mobile Subscriber Integrated Services Digital Network (MSISDN) telephone address of the second user telephony device 524 of user B using an ISDN User Part (ISUP) signaling protocol on a circuit switching network. The ISUP signaling protocol may be part of a signaling system such as Signaling System 7 (SS7) used in a public switched telephone network (PTSN) as the circuit switching network to set up telephone calls between two telephony devices. In other embodiments, the telephony address may be associated with the second user telephony device 524 on a packet switching network, such as IMS VoLTE.

Packet switching in such a packet switching network groups data such that it can be transmitted as packets (e.g., discrete blocks of data) over a digital network. As set forth above, one such packet switching network may be IMS VoLTE, utilizing an Internet Multimedia Subsystem (IMS) and a packet switched voice service as Voice over Long Term Evolution (VoLTE), which is a high-speed wireless communication for mobile telephony devices and data terminals such as other smart mobile devices that may be on an Internet of Things (IoT) network.

IMS VoLTE involves VoLTE as a high-speed wireless communication protocol utilizing IMS to implement standards and procedures for delivering voice communication as well as data over 4G LTE networks. Data from a circuit-switched cellular networks (i.e., Code Division Multiple Access (CDMA) and Global System for Mobile Communications (GSM)) may be transformed into network packets before being broadcast on a public switching network such as IM VoLTE. VoLTE uses IMS-based networks to offer these services. VoLTE supports amongst other services, rich multimedia communications including high definition audio and video services that may operate over 4G and LTE data capable networks.

IMS resides as a stand-alone system outside of a VoLTE network and may be connected to the VoLTE network through a communicative coupling through an interface to a gateway of the VoLTE network, such as a SGi interface connecting IMS with a Public Data Network (PDN) Gateway, described in greater detail below. One or more UEs may be communicatively coupled through an Evolved University Mobile Telecommunications System Terrestrial Radio Access Network (E-UTRAN) and interfaces to an Evolved Packet Core (EPC) of the VoLTE network and further to IP services such as an IMS network and the Internet. E-UTRAN is a radio access network acting as an air interface of an 3rd Generation Partnership Project (3GPP) LTE mobile network upgrade path.

The EPC of the VoLTE network may include functional elements such as a Mobile Management Entity (MME), a Serving Gateway (S-GW), and the PDN Gateway (P-GW). The MME is control point responsible for most control plane functions. The S-GW flows through IP packets in uplink and downlink transmissions and handles handovers. The PDN Gateway allocates IP addresses to UEs and acts as a point of communication between EUTRA and other non-3GPP services such as the Internet. Respective PDN Gateways may be associated with and provide interfaces to IMS and the Internet, such as the SGi interface that is a reference point between the PDN Gateway and the packet data network.

The EPC may further include a Policy and Charging Rule Function (PCRF) node as a functional element to determine permitted traffic types in real-time and traffic accounting for billing purposes. When a UE starts a VoLTE call, the PCRF may check if the UE has a subscription to start the call and, if so, setup a dedicated bearer for IMS services. An IMS powered UE may include a Universal Integrated Circuit Card (UICC) and a Session Initiated Protocol User Agent (SIP UA) to send and receive SIP messages and provide telephony functionality. The UICC may include identity modules such as a Subscriber Identity Module (SIM) and an IP Multimedia Services Identity Module (ISIM) for use by an IMS subsystem.

A multitude of elements may comprise an IMS/VoLTE Packet Switched network; however, for the sake of simplicity, IMS/VoLTE may be referenced herein as a generalized SIP network subsystem. Further, main functional nodes of the VoLTE architecture as described herein may be defined in 3GPP while allowing non-3GPP technologies to interface with and be managed from the IMS VoLTE network. The IMS functional elements of the IMS Core governing call setup and control may include Proxy Call Session Control Function (P-CSCF) and Serving Call Session Control Function (S-CSCF).

The P-CSCF may be the initial point of contact for session signaling for the IMS-enabled VoLTE User Equipment (UE). The P-CSCF may behave as a SIP proxy by forwarding SIP messages between the UE and the IMS Core Network.

The S-CSCF includes data regarding user knowledge and application permissions associated with a user account. The S-CSCF of the IMS Core may provide session, routing and billing functions for all sessions under its control, and invokes Application Servers based on Initial Filter Criteria (IFC) received from the Home Subscriber Server (HSS) during service registration. The S-CSCF may act as SIP registrar for the VoLTE User Equipment (UE) of a user account that the HSS and Interrogating Call Session Control Function (I-CSCF) assign to it. The S-CSCF may query the HSS for the subscriber profiles which are used to authorize and manage requested services.

The S-CSCF may thus be a central node on the IMS signaling plane. The S-CSCF may be a SIP server that also performs session control, and typically uses Diameter Cx and Dx interfaces to download and upload user profiles associated with user accounts to and from the HSS. The S-CSCF may also handle SIP registrations and be in the signaling path of all messages. Significantly, the S-CSCF may determine which Application Server (AS) the SIP message from the SIP UA of the UE has handled by the P-CSCF will be forwarded to for the provision of service, and provide requisite routing. The S-CSCF may thus enable the assignment of an AS to the session when required. In some embodiments, the role of the S-CSCF is to execute the session request by locating a destination endpoint and conducting the signaling toward it. The S-CSCF may also able to coordinate with a Media Resource Function (MRF) for any media announcements/tones to be played to the originating party. Per the 3GPP technical specifications, the S-CSCF may also act as a Charging Triggering Function (CTF) managing charging of users of the IMS infrastructure and services. The S-CSCF may communicate with an IMS Gateway Function (IMS-GWF) that may operate as a SIP application server and may signal the S-CSCF to terminate a session when a user runs out of credits during a session. Although the S-CSCF may act as the CTF, a same functionality may be applied to any IMS network node.

In embodiments, as the CTF node in an IMS network, the S-CSCF may perform several tasks in order to identify the correct charging to apply, that corresponds to and is triggered by the user session activity. The S-CSCF, when performing its normal routing actions for the SIP signaling may determine whether the SIP information represents a chargeable activity, and which type of charging mechanism may be applied. The charging mechanisms for IMS sessions may be either Offline (Post-paid) charging, using accounting messages, or online (Pre-paid) charging, using substantially real time credit control messages and procedures. Information about IMS transactions may be sent from the S-CSCF to a charging node that collects this information and stores it in the form of Charging Data Records (CDRs). While the IMS embodiments herein may recite a dialed telephone address (SIP "user=phone"), other address formats including, without limitation, an alphanumeric Request-URI (R-URI) may be specified.

Table 1 below is a glossary of acronyms used in this disclosure.

TABLE 1

| | |
|---|---|
| ABMF | Account Balance Management Function |
| A-SBC | Access Session Border Controller |
| AS | Application Server |
| B2BUA | Back To Back User Agent |
| BCD | Binary Coded Decimal |
| BGCF | Border Gateway Control Function |
| CCA | Credit Control Answer |
| CCR | Credit Control Request |
| CSCF | Call Server Control Function |
| CTF | Charging Triggering Function |
| DNS | Domain Name System |
| ESD | Exceptional Service Delivery |
| FQDN | Fully Qualified Domain Name |
| HSS | Home Subscriber Server |
| I-CSCF | Interrogating Call Session Control Function |
| ICSI | IMS Communication Service Identifier |
| IFC | Initial Filter Criteria |
| IMS: | Internet Multimedia Subsystem |
| IMS-AGW | IMS Access Gateway |
| IMS-ALG | IMS Application Level Gateway |
| LTE | Long Term Evolution |
| MCC | Mobile Country Code |
| MGCF | Media Gateway Control Function |
| MNC | Mobile Network Code |
| MNO | Mobile Network Operator |
| MRF | Media Resource Function |
| P-CSCF | Proxy Call Session Control Function |
| PCC | Policy and Charging Control |
| PCEF | Policy and Charging Enforcement Function |
| PCO | Protocol Configuration Options |
| PCRF | Policy Charging and Rules Function |
| R-URI | Request URI |
| SBMF | Session Balance Management Function |
| S-CSCF | Serving Call Session Control Function |
| SIP | Session Initiation Protocol |
| TAS | Telephony Application Server |
| URI | Uniform Resource Identifier |
| VOLTE | Voice Over LTE |

Referring to FIG. 1A, a flowchart shows a method for a zero charge subscriber identification module (SIM) card system on an asynchronous zero charge telephony protocol system and a balance-dependent (i.e., prepaid) SIM card associated with a first user IMS mobile device. FIG. 1A shows an embodiment in which a prepaid (i.e., balance-dependent) SIM card may be used by the first user mobile device 520 on the packet switching network. The flowchart methodology of FIG. 1A may be followed when there is insufficient balance or funds available to use the prepaid SIM card. FIG. 1A works in conjunction with the method of FIG. 2, as described in greater detail below.

Referring again to FIG. 1A, flow items 140-144 and 146-147 are representative of steps to progress through prior to progression to the flow items of FIG. 2. In flow item 140, the first user (i.e., user A) may have a prepaid first user account associated with the prepaid SIM card of the first user mobile device 520. The first user may dial, through a first VoLTE User Equipment (UE) as the first user mobile device 520, a telephone number of a second user telephony device 524 (i.e., user B). In flow item 141, the call request by the first user mobile device 520 may generate a SIP INVITE request, which may be received by IMS element P-CSCF, which in turn may forward the SIP INVITE request to IMS element S-CSCF in flow item 142. In flow item 143, the S-CSCF, or an equivalent IMS node (such as a Telephone Application Server (TAS)) may send an Initial Credit Charge Request (CCR) (with, for example CC-request-type "INITIAL_REQUEST" or INITIAL request as a CCR protocol message) to an Online Charging System (OCS) associated with the IMS Core. Upon receiving the CCR message, an OCS Session Balance Control Function (SBCF) may retrieve the account information of a first user account associated with the first user mobile device 520 of user A and the subscribed profile from an OCS Account Balance Management Function (ABMF). The SBCF may then send a Tariff Request message to a Rating Function (RF) to determine a tariff (i.e., charge) for the IMS call.

Based on the subscriber information, the RF may reply to the SBCF with the Tariff Response message, which may include the billing plan and the tariff information for the IMS service. When the tariff information is received, the SBCF may perform a credit unit reservation with the ABMF and may reply to S-CSCF with a Credit Control Answer (CCA) message containing any granted credit (i.e., specifying the number of minutes allowed for the call, for example). When the account associated with user A has insufficient credit balance, the S-CSCF may receive a CCA message that indicates a credit authorization failure (e.g., CCA result code: DIAMETER_AUTHORIZATION_REJECTED). Typically, upon failing to receive credit authorization, the S-CSCF may coordinate with a Media Resource Function (MRF) to play an error announcement to the originating party, such as "You have insufficient credit to complete this call." The present disclosure describes various embodiments to complete a call even with insufficient credit, at least some of which embodiments may include rerouting the request to an Application Server providing network managed communications permitting controlled contact establishment with the second user telephony device 524 of user B, rather than playing such an error announcement and denying contact establishment.

In flow item 144, the system may be configured to determine whether the prepaid SIM card has insufficient credit to place the call. If the OCS CCA indicates credit authorization approval, the NO branch leads to flow item 145, which results in the call continuing to be placed. This may be based upon the first user account having sufficient balance to complete the call to the second user telephony device 524, using the first user mobile device 520. Thus, the call may be permitted to proceed to speech post answering by the second user telephony device 524 and for a maximum duration based on the sufficient balance. In embodiments, if the OCS CCA indicates sufficient credit (i.e., success, no fail) in flow item 144, the NO branch from flow item 144 may then result in the S-CSCF forwarding the INVITE request to a Border Gateway Control Function (BGCF) and continuing to progress and complete the call toward the second user telephony device 524 of user B. It is contemplated by this disclosure that while the embodiments described herein depict the device 524 as a second user mobile device, the device 524 may alternatively be a fixed line device (e.g., directly wired into and connected with a telephony line).

Otherwise, if the OCS CCA indicates in flow item 144 a credit authorization failure, the YES branch leads to flow item 146. Flow item 146 results in the S-CSCF rerouting the INVITE request, or a modified INVITE request including a distinguishing service code prefix and an asynchronous signaling switch destination address (i.e., *B@, as described in greater detail below). In various embodiments, the modified INVITE request may be associated with a modified call signal that may incorporate the distinguishing service code prefix in the Request Uniform Resource Identifier (URI) and associated headers, directing the request toward the an asynchronous signaling switch such as the Star node and away from the second user telephony device 524 of user B. The asynchronous signaling switch then performs asynchronous signaling communications as disclosed and described in FIG. 2.

In such an embodiment, the addressing notation "*B@" may be utilized as shorthand for a star (or similarly prefixed) telephone number associated with user B, and an asynchronous signaling switch destination address as indicated by @ a star domain. By way of example, and not as a limitation, *B@ may be a modified call signal of *0845551234@starlogik.com, where * is the distinguishing service code prefix, 0845551234 is the telephony address of the second user telephony device 524 of user B (e.g., the telephony address of a mobile device 524 or alternatively the telephony address of a fixed line device 524), and @starlogik.com is the asynchronous signaling switch destination URL address to route the modified signal to the asynchronous signaling switch.

Referring to FIG. 1B, a flowchart of another method for a zero charge subscriber identification module (SIM) card system on an asynchronous zero charge telephony protocol system and a balance-dependent (e.g., prepaid) SIM card associated with a first user IMS mobile device 520 that may modify a call signal request is shown. By contrast, FIG. 1A sets forth a methodology in which the first user mobile device 520 transmits a call signal that may further be modified downstream. FIG. 1B, as described below, set forth a methodology in which the first user mobile device 520 transmits a call signal request and may receive back return instructions to transmit a modified call signal request from the first user mobile device 520.

With reference to FIG. 1B, flow items 150-153, and 155-157 are representative of steps to progress through, by the prepaid system, prior to progression to the flow items of FIG. 2. In flow item 150, the first user (e.g., user A) may have a prepaid account associated with the prepaid SIM card on the first user mobile device 150 as a first VoLTE User Equipment (UE) on a packet switching network such as IMS VoLTE. The first user mobile device 150 may be used to dial a telephone number of a second user telephony device 524 (e.g., user B).

In flow item 151, the call request by the first user mobile device 520 may generate a SIP INVITE request, which is received by the IMS network. In flow item 152, the IMS network may send an Initial Credit Charge Request (e.g., CCR with CC-request-type "INITIAL_REQUEST") to the Online Charging System (OCS). When the account associated with user A has insufficient credit balance, the S-CSCF may receive a Credit Control Answer (CCA) message that indicates a credit authorization failure (e.g., CCA result code: DIAMETER_AUTHORIZATION_REJECTED).

In flow item 153, the system may be configured to determine whether the prepaid SIM card has insufficient credit to place the call. If the OCS CCA indicates sufficient credit to place the call (i.e., success), the NO branch from flow item 153 may then result in the IMS network forwarding the invite to a Border Gateway Control Function (BGCF) in flow item 154 and continuing to progress and complete the call toward the dialed second user telephony device 524 of user B.

Otherwise, if the OCS CCA indicates a credit authorization failure in flow item 153, the YES branch leads to flow item 155, redirecting the call signal and sending an instruction back to the first user mobile device 520 to send a modified call signal associated with the second user telephony device 524. This instruction may result in the IMS network responding to the first user mobile device 520 INVITE request with a SIP 3XX Class Response. One such redirection of the call signal back to the first user mobile device 520 by the IMS network may be achieved with a SIP 302 Moved Temporarily response, which may stipulate a redirected Contact header on the disclosed Star Domain (star prefixed B address signals and/or star URL).

On receiving the SIP 302 response with the Star Contact Header as a modified call signal submission instruction, the first user mobile device 520 may send an Acknowledgement (ACK) message. Then, in flow item 156, the first user mobile device 520 may formulate a new INVITE request with the modified call signal and the modified address, as the additionally supplied Star URI and Contact address, to the IMS network. Such a SIP 3XX Class Response, upon encountering the insufficient credit condition, may thus seamlessly loop the INVITE request back via the originating first user mobile device 520, through which the resultant new INVITE request to the supplied modified Contact header with the modified call signal may effectively be used to transfer the call to the asynchronous signaling switch as a new service domain (e.g., the Star Switch) for asynchronous contact establishment.

In one embodiment, at flow item 157, the IMS may perform a Domain Name System (DNS) resolution on the Star URL in the R-URI, in order to determine the IP address of the SIP Server, then directing the request toward the Star node as the asynchronous signaling switch at flow item 158, away from the B destination device 524. In one embodiment, at flow item 157, upon receiving the newly formulated modified INVITE request from first user mobile device 520, the IMS network may utilize Initial Filter Criteria (IFC) and associated Service Trigger Points (STP), as described below, to route the INVITE request to the Star node in flow item 158, away from the B destination device 524. The Star node may perform asynchronous signaling communication between the first user mobile device 520 of user A and the second user telephony device 524 of user B as disclosed and described in FIG. 2.

Referring to FIG. 2, a flowchart of a method for continuing the method of FIG. 1A or FIG. 1B is depicted. Thus, FIG. 2 continues the process of using the modified switch routing to place and complete a call, and engage a ring, without incurring a charge or cost to the account associated with the first user mobile device 520 placing the call through either the balance-dependent (e.g., prepaid) SIM card of FIGS. 1A or 1B using the respective methodologies described herein. For example, FIG. 1A is a VoLTE-originating call, such that FIG. 2 depicts an embodiment where a VoLTE call from the first user mobile device 520 on a packet switching network (e.g., IMS VoLTE) is sent to the second user telephony device 524 of user B, which can be on a circuit switching network. In another embodiment, such as shown in FIG. 3C and described in greater detail further below, the second user telephony device 524 may be a VoLTE destination device on a packet switching network similar to the first user mobile device 520.

In flow item 200, the Star Switch as the asynchronous signaling switch may be configured to logically and physically decouple the call originating/uplink (left side) and terminating/downlink (right side) legs by signaling them independently, in the backward direction to the caller and in the forward direction to the called, along distinct routes of flow items 210 and 260, respectively. These two independent call paths may be signaled substantially simultaneously. In flow item 210, which describes the process along the independent call path between the first user mobile device 520 and the switching node as the originating call setup leg, the Star Switch may be configured to instantly respond to the received re-routed signal by presenting a preemptive ring-back-tone (RBT) to user A, thereby maturing the call request into a call dialog. The RBT may thus generate a ring signal to provide comfort to user A that the call is accepted and is going to be presented to user B.

In flow item 220, the Star Switch may be configured to determine via a configuration setting whether a native CDR generation on the originating carrier network is requested. If a CDR is not requested per the Star Switch configuration, the call may flow to flow item 240. However, if the CDR generation option is set, the call may flow to flow item 230, and the Star Switch may be configured to answer the call by going OFF HOOK. Answering the call may start a call duration timer that records the duration of the connected (answered) call.

The call then flows to flow item 240, in which the Star Switch may be configured to then hang up the call if progressing through flow item 230 by going back ON HOOK momentarily thereafter. Since a CDR may typically record call durations in increments of 1 second, milliseconds may be either rounded up or down to the nearest second. In order to generate, for example, a zero second CDR, the Star Switch may simply disconnect the call in less than 500 milliseconds (ms). To cater for signaling latency, such a zero second CDR embodiment would substantially connect and disconnect within milliseconds. For example, the call may be answered and then disconnected within 100 ms. The present disclosure describes a manner to generate and suppress billing for unanswered calls through recording these early CDRS. For example, the HOOK FLASH signaling may permit carriers to generate native zero second CDRS for recording such signaled calls.

During flow item 240, the Star Switch may be configured to disconnect the call. If the call was previously answered in flow item 230, the state returns to ON HOOK. Otherwise if progressing directly between flow items 220 and 240, the call may be terminated without answering and the originating/uplink leg of the call is complete. Thus, in flow item 250, the first user mobile device 520 may be serviced and disconnected from the call.

With respect to the terminating/downlink leg on the right side between the Star Switch and the second user telephony device 524, flow item 200 may progress to flow item 260. In parallel to signaling on the uplink as shown through flow items 210-250, the Star Switch may be configured to establish a call leg on the downlink path towards a destination to the second user telephony device 524 of user B. The call to user B may be set with calling line identity for user A associated with the first user mobile device 520 and extracted from the uplink request signal. The call may route via an SBC/GMSC to the network of user B where the second user telephony device 524 is on a circuit switching network. In an embodiment in which the second user telephony device 524 is on a packet switching network, such as in FIGS. 3C-3D described in greater detail further below, the call may route via an S-CSF to the network of user B.

In flow item 270, the Star Switch may be configured to respond to indication that the second user telephony device 524 of user B is ringing or otherwise alerting the user B of an incoming call identifying the user A. In flow item 280, in response to mobile device 524 ringing, the Star Switch may be configured to cancel (release) the call. In flow item 290, cancelling the call may release and complete the downlink dialog and leg, which has now successfully deposited a ring bearing the calling line identity of user A at the destination second user telephony device 524 of user B.

Thus, referring to FIG. 2, in one embodiment, a user A attempting to place a call to the second user telephony device 524 of user B as the caller from the first user mobile device 520 may be switched ON/OFF the air prior to the system alerting user B. The system may switch and signal the zero airtime call to deliver an asynchronous flash communication with user A and user B through the following sequence of steps. With respect to user A, the call from the first user mobile device 520 of user A may be disconnected via the switching node in the backward (originating/uplink) direction to user A, e.g., after presenting one ring back. With respect to user B, the call to the second user telephony device 524 of user B may be disconnected via the switching node in the forward (terminating/downlink) direction to user B, e.g., after one ring. Such an asynchronous and disconnected communication protocol may be configured to prevent the call from progressing to speech, i.e., as would generally incur a charge, since the protocol prevents user A from being directly connected through to user B. Since the originating and terminating call phases are logically and physically decoupled such that they are switched, signaled and disconnected independently, the disclosed methods and systems in some embodiments are asynchronous and do not establish synchronous end to end connectivity directly between users A and B. Thus, user A is not online when the second user telephony device 524 of user B rings. Through the protocols disclosed herein, billing may be reversed on callback from user B to user A, such that revenue may flow and accrue from the preceding zero airtime signaling as described, from user A to user B.

Further, while the RBT provides user A with auditory confirmation, the automatic disconnect may provide user A with visual confirmation that the request was serviced to completion. In an embodiment in which user A as the caller is momentarily switched ON and OFF the airwaves (e.g., in just one second), even though the B party has yet to be alerted, the preemptive and accelerated RBT may comfort the user that the call is being placed to user B by the switching node.

If the Star Switch is unable to contact the second user telephony device 524 of user B on the downlink leg of FIG. 2, the call may automatically enter a retry schedule. Automatically retrying such failed call attempts on behalf of the user A may attenuate repetitive manual redialing by user A. Such repetitive manual redial behavior may spiral into a negative feedback loop that exacerbates network load and busy conditions, resulting in more and more failed call attempts. The preemptive RBT and automated retry solution, for example, on a retry schedule, as disclosed, may deliver accelerated asynchronous and automated digital ringing.

The Star Switch signaling of FIGS. 1A-2 is described in greater detail with respect to FIGS. 3A-3B below, which depict step ladder sequences for flash signaling embodiments in which at least the first user mobile device 520 is on a circuit switched network (e.g., IMS VoLTE) and for the prepaid call with insufficient balance and balance-dependent SIM card of corresponding FIGS. 1A and 1B. FIGS. 3C-3E depict other embodiments of step ladder sequences for flash signaling in which at least the first user mobile device 520 is on a packet switched network. As will be described in greater detail below, FIG. 3C is similar to FIG. 3A but depicts instead that the second user telephony device 524 is on a packet switched network. FIG. 3D is similar to FIG. 3A but depicts the second user telephony device 524 is on a packet switched network and that the first user mobile device 520 is associated with a balance-independent SIM card. FIG. 3E depicts the second user telephony device 524 is on a packet switched network, the first user mobile device 520 is associated with a balance-independent SIM card, and that both devices 520, 524 communicate on a synchronous zero charge telephony protocol system.

Figure 3A:
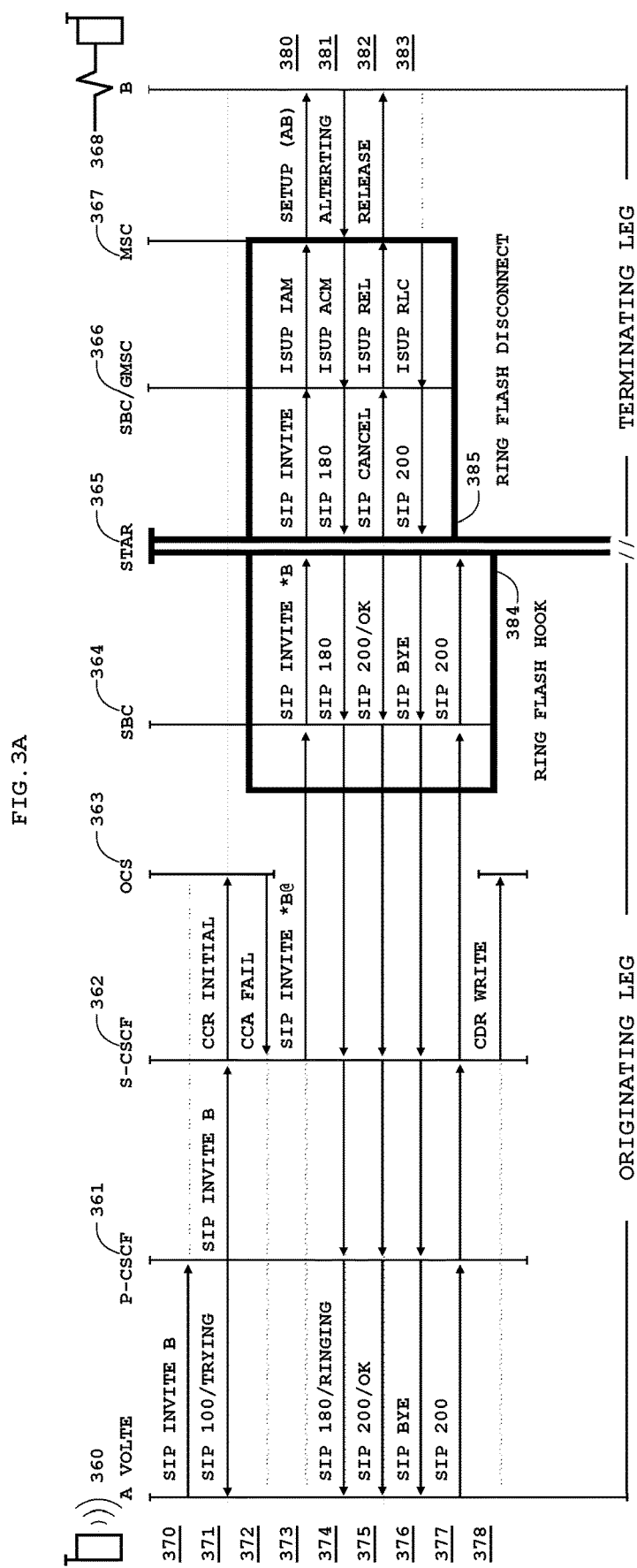
FIG. 3A schematically depicts a control scheme, corresponding to the flowchart in FIG. 1A, illustrating a sequential step ladder structure for an IMS originating device and a circuit switched terminating device, according to one or more embodiments shown and described herein.

Referring to FIG. 3A, which is a control scheme corresponding to the flow methodologies of FIGS. 1A and 2, the originating VoLTE call request is shown and described in further detail. In flow item 370, user A through VoLTE UE device 360, as the first user mobile device 520, dials the telephone number of device 368 (e.g., the second user telephony device 524) of user B The dialing results in sending a SIP INVITE request to P-CSCF 361, whose address was discovered during a UE registration procedure. The INVITE request may contain, within the Contact header and the P-Preferred-Service header, the IMS Communication Service Identifier (ICSI) for IMS Multimedia Telephony (e.g., urn:urn-7:3 gpp-service.ims.icsi.mmtel).

The P-CSCF 361 adds a P-Charging-Vector header and forwards the SIP INVITE in flow item 371 to the S-CSCF 362 identified during the registration process. The S-CSCF 362 receives the SIP INVITE from the P-CSCF 316 The S-CSCF 362 invokes any VoLTE services as defined and triggered by the Initial Filter Criteria (IFC) within the subscriber profile, which is retrieved during the IMS Registration. The S-CSCF 362 checks the P-Preferred-Service header in the SIP INVITE request (e.g., MMTel ICSI) and verifies that the user is authorized for the service by validating against the subscribed services retrieved in the service profile during IMS Registration.

For example, with online charging, network resource usage may be granted by the OCS based on the price or the tariff of the requested service and the balance in the subscriber's account. The OCS may support at least two types of online charging functions: session-based charging function (SBCF) and the event-based charging function (EBCF). The SBCF may be responsible for network bearer and session-based services such as voice calls, GPRS sessions, or IMS sessions. Moreover, it may be able to control the session by permitting or denying a session establishment request after checking the subscriber account. In the OCS, a rating function (RF) may determine the price/tariff of the requested network resource usage in real-time.

In embodiments, in flow item 371, the P-CSCF 361 may respond with SIP 100 TRYING to the requesting UE in order to arrest an INVITE timeout. The P-CSCF 361 may then forward the INVITE to the S-CSCF 362, which in turns may send an Initial Credit Charge Request (CCR, with for example, CC-request-type "INITIAL_REQUEST") to OCS 363. The OCS 363 may collectively comprise the Session Balance Control Function (SBCF) and the Account Balance Management Function (ABMF).

In flow 372, on receiving the CCR message, the SBCF may retrieve the account information and the subscribed profile from the OCS ABMF. The SBCF may then send a Tariff Request message to the RF to determine the tariff of the IMS call. Based on the subscriber information, the RF may reply to the SBCF with the Tariff Response message, which may include the billing plan and the tariff information for the IMS service.

When the tariff information is received, the SBCF may perform credit unit reservation with the ABMF. It may then reply to S-CSCF 362 with a Credit Control Answer (CCA) message containing any granted credit (e.g., specifying the number of seconds or minutes allowed for the call). When it has been determined that the account associated with user A has insufficient credit, the CCA message returned in flow item 372 may indicate credit authorization failure, such as CCA FAIL in flow item 372 (e.g., CCA result code: DIAMETER_AUTHORIZATION_REJECTED).

In one embodiment, in flow item 373, responsive to receiving the CCA failure, the S-CSCF 362 or attendant TAS may then reroute the INVITE request with a modified call signal (e.g., *B@) to the IP address of the Star Node 365 as the asynchronous signaling switch, typically via Session Border Controller SBC 364, thereby routing the call away from the dialed destination (B) of device 368 (e.g., the second user telephony device 524) to deliver the newly disclosed communication methods.

In flow item 373 as shown, responsive to receiving the CCA failure, the S-CSCF 362 or attendant TAS may thus create a new call leg on a modified INVITE request including a modified call signal with a modified address including a distinguishing service code prefix and an asynchronous signaling switch destination address. In embodiments, the modified address incorporates a distinguishing service code (e.g.: * or XXX) prefixed to the B address signals, and specifies as a network identifier for the asynchronous signaling switch destination address the star domain in the branched URI. As non-limiting examples, the modified address may be of the form INVITE sip:*B@starlogik.com SIP/2.0 or of the form INVITE sip:555B@55.225.225.45 SIP/2.0, where B is representative of the dialed telephone number (the address signals), 555 is the applied service code prefix, and 55.225.225.45 is the Star Switch IP address (IP4 notation).

The S-CSCF 362 may then add a Via Header with new branch tag, thereby branching (forwarding or sequentially forking) the call to the Star Node 365 as the asynchronous signaling switch, typically via the SBC 364, routing the call away from the dialed destination (B) of device 368 to deliver the disclosed communications methods.

The star URL may further incorporate a Mobile Network Code (MNC) and Mobile Country Code (MCC) assigned to the Mobile Network Operator (MNO), such as, for example: INVITE sip:*B@7.655.starlogik.com SIP/2.0

The above INVITE example illustrates a DNS URL for a South African MNO CellC (MCC=655 being the country designation for South Africa, and MNC=7 being the Network Identifier for CellC). The MNC level 4 and MCC level 3 domains permit dynamic DNS resolution on a Fully Qualified Domain Name (FQDN) down to country and carrier for localized application server hosting.

In accordance with the Call Data Record generation reconciliation as disclosed herein, originating CDRS for the Flash Hook communication methods (Asynchronous Uplink, block 384) may generate CDRS that, in some embodiments, are recorded with address signals A and *B (A*B titled CDRS). Branching the INVITE request thus with the modified B address signals, as described above, may permit carrier reconciliation with return call (terminating) CDRS recording B and A address signals (BA titled CDRS) for callers returning with sufficient credit.

This B address signal modification may ensure that the originating S-CSCF CDRS, generated when the Star Node 365 performs the Hook Flash method in flow item 375, going OFF HOOK (picking up the call) and then momentarily thereafter, in flow item 376, going back ON HOOK (hanging up the call), collectively service block 384 as described, and are distinguishable as A*B (or XXXB) titled CDRS. Such A*B generated CDRS (e.g., the Star CDR dataset) can then be matched to terminating BA titled CDRS (e.g., the Callback CDR dataset) for callbacks that get answered and generate revenue within prescribed callback periods.

Figure 3B:
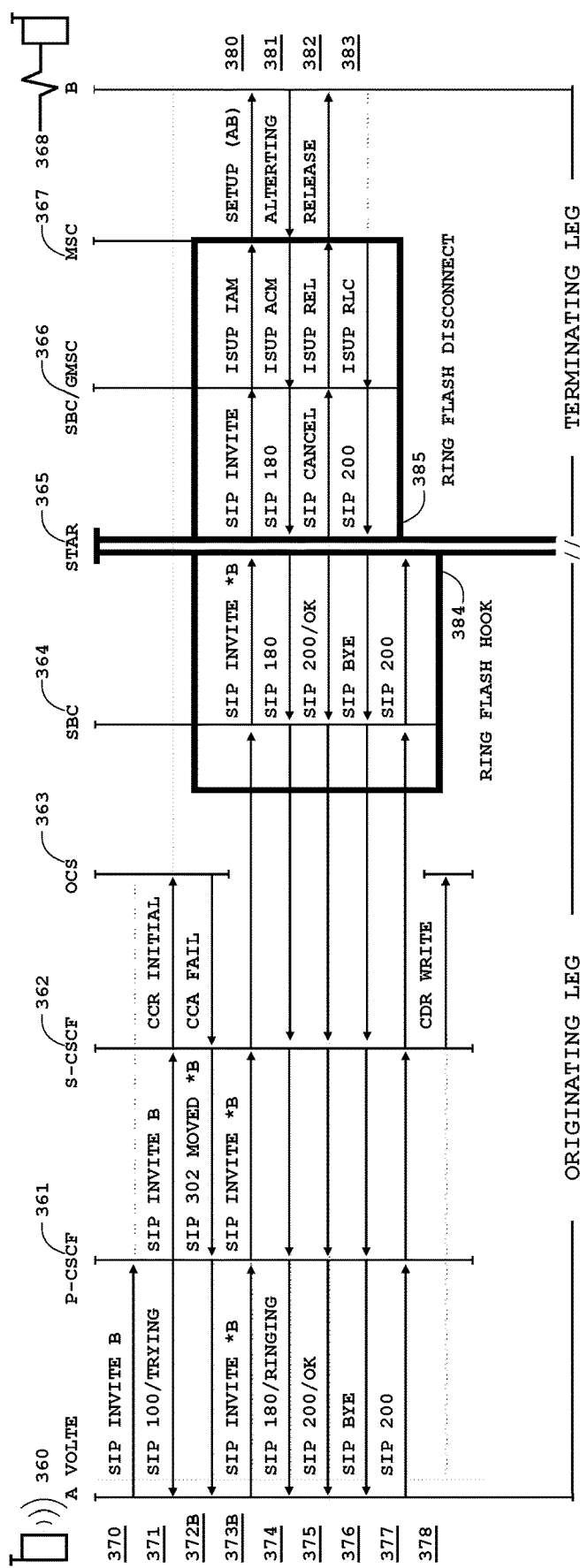
FIG. 3B schematically depicts another control scheme, corresponding to the flowchart in FIG. 1B, illustrating a sequential step ladder structure for an IMS originating device and a circuit switched terminating device, according to one or more embodiments shown and described herein.
Figure 3C:
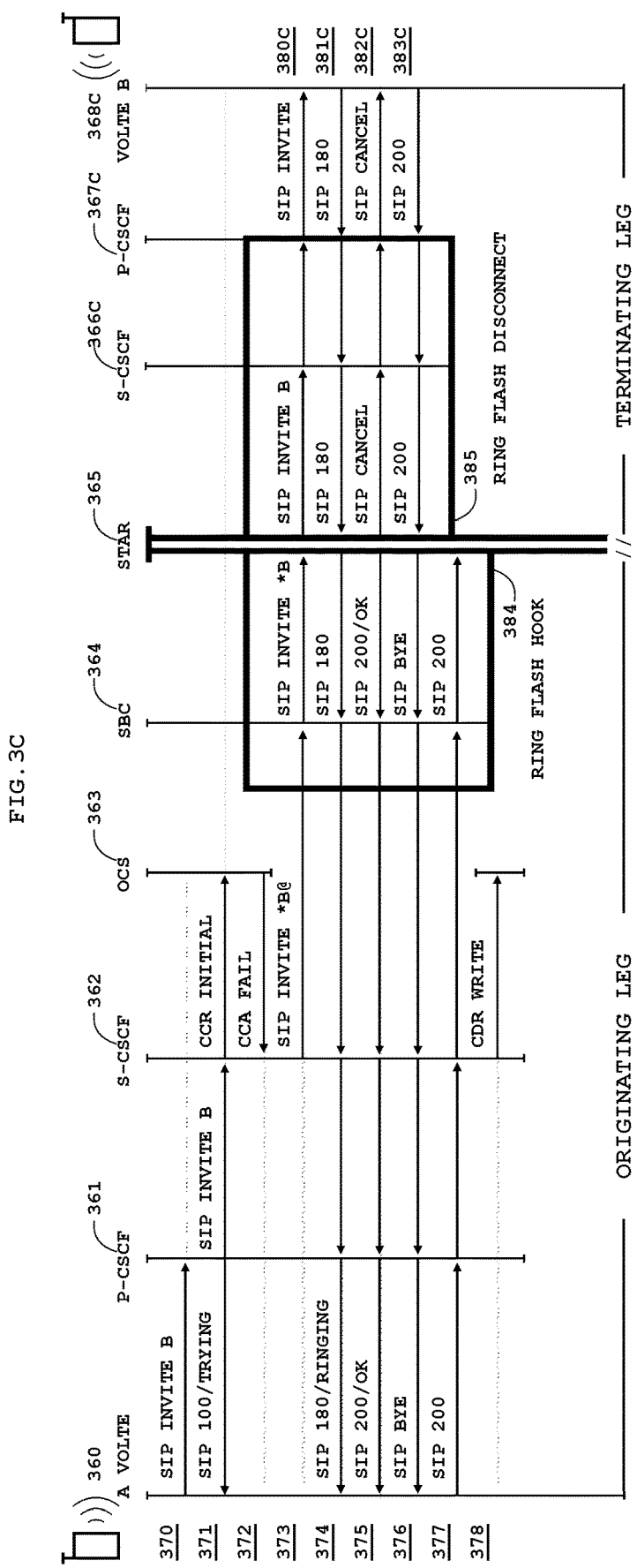
FIG. 3C schematically depicts another control scheme illustrating a sequential step ladder structure for an IMS originating device and an IMS terminating device, according to one or more embodiments shown and described herein.
Figure 3D:
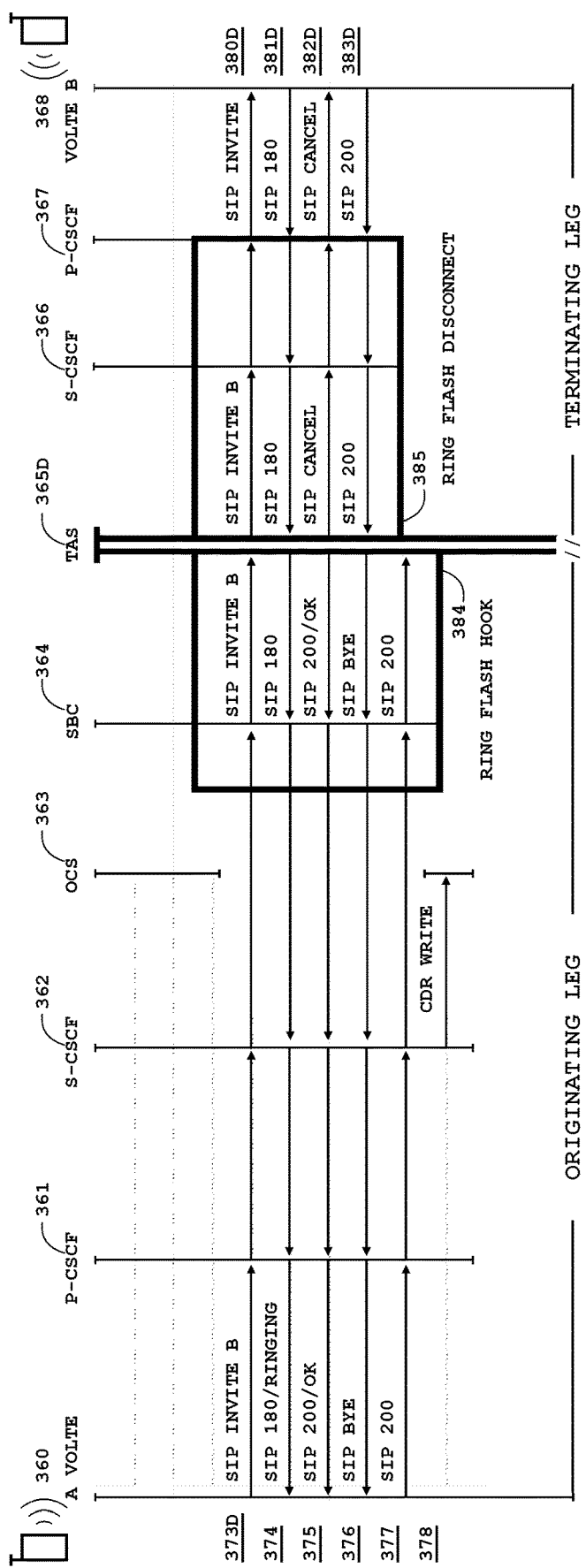
FIG. 3D schematically depicts another control scheme illustrating a sequential step ladder structure for an IMS originating device and an IMS terminating device, the IMS originating device associated with a balance-independent SIM card, according to one or more embodiments shown and described herein.
Figure 3E:
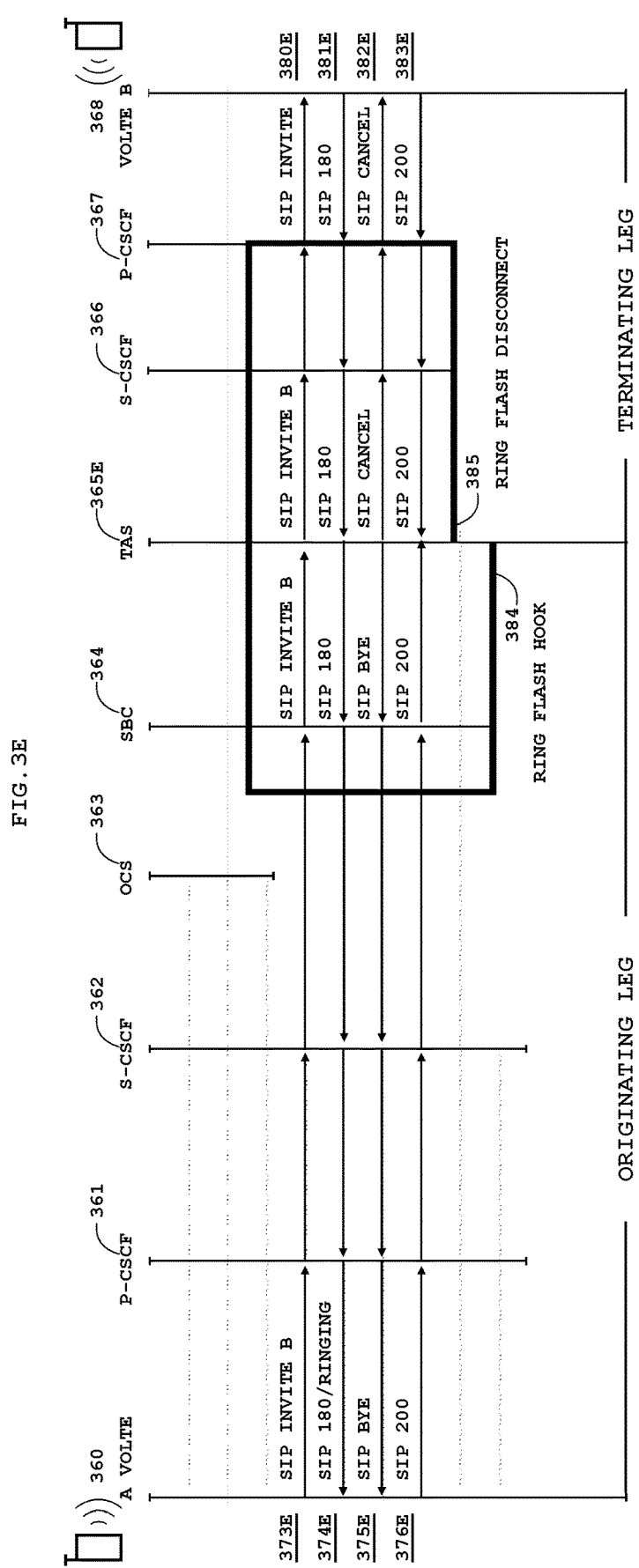
FIG. 3E schematically depicts a control scheme illustrating a sequential step ladder structure for an IMS originating device and an IMS terminating device on an synchronous zero charge telephony protocol system, the IMS originating device associated with a balance-independent SIM card, according to one or more embodiments shown and described herein.

Referring to FIG. 3B, which is a control scheme corresponding to the flow methodologies of FIGS. 1B and 2, the UE device 360 may receive an instruction to transmit the modified call signal. As shown in flow item 372B of FIG. 3B, the IMS network, upon detecting the insufficient credit condition, may respond to the originating UE INVITE request with a SIP 302 Moved Temporarily instruction, providing the UE device 360 with modified B address signals in the Contact header, and instructing the UE to establish a new INVITE on the Contact address provided, thereby transferring the call via flow item 373B to the STAR Application Server (AS).

In embodiments, this modified Contact header may incorporate a star (*) prefix to the B address signals (dialed number), and may further designate a star URL (e.g.: starlogik.com). Utilizing the MNC and MCC qualified domain notation as described above, the SIP 302 response may stipulate a new Contact header such as Contact: <sip:*08845551234>or Contact: <sip:*08845551234@7.655.starlogik.com>. The first Contact example above specifies a telephone URI, with the second Contact example specifying a FQDN.

Referring to FIG. 3B, one such originating INVITE transfer embodiment is shown and described. Otherwise, FIG. 3B is functionally equivalent to FIG. 3A and shares all steps and labels with FIG. 3A with the exception of labels and flow items annotated with the letter B serving to highlight the SIP redirection.

In Flow Step 372B, upon receiving the CCA FAIL, S-CSCF 362 may redirect the INVITE with a SIP 3XX class response, for example SIP 302 Moved Temporarily, specifying modified B address signals and domain in the Contact header, referencing the Star AS. In Flow Step 373B, upon receiving the SIP 302 response, the originating UE device 360 may respond with ACK (not shown), and may then formulate a new INVITE request to the Star Contact provided (R-URI on a star prefixed phone number and/or star URL domain). In embodiments, the OCS zero rates (i.e., permits without charge) all such star prefixed phone numbers in order to permit the new INVITE call request to progress to the Star AS regardless of credit availability.

The IMS network may set an Initial Filter Criteria (IFC) defining Service Trigger Points (STP) to route the star addressed call request to the Star Application Service. In an embodiment, all star prefixed B number INVITES may be filtered per the following IFC logic scheme:

```
<InitialFilterCriteria>
    <Priority>0</Priority>
    <TriggerPoint>
    <ConditionTypeCNF>0</ConditionTypeCNF> <!-- Logical AND
    <SPT>
        <Group>1</Group>
        <Method>INVITE</Method>
```

-continued

```
    </SPT>
    <SPT>
        <Group>1</Group>
        <SIPHeader>
            <Header>To</Header>
            <Content>*</Content><!--Example service prefix
        </SIPHeader>
    </SPT>
    <SPT>
        <Group>1</Group>
        <SessionCase>0</SessionCase> <!-- 0=Originating Registered or
3=Originating Unregistered
        </SPT>
    </TriggerPoint>
    <ApplicationServer>
        <ServerName>sip:7.655.starlogik.com</ServerName>    <!--
Example: MCC 655=ZA MNC 7=CellC
        <DefaultHandling>0</DefaultHandling>
    </ApplicationServer>
</InitialFilterCriteria>
```

The above IFC and associated triggers may then be applied by S-CSCF 362, in flow step 372B, to transfer any insufficient credit caller, redirected thus, or any manually star addressed calls (e.g., where the user dials * followed by the phone number) to the Star AS for the disclosed communication methods. Such an IFC may permit the carrier to identify the target URI destination (Star Switch) without requiring a telephone number to URI Registry. In one embodiment, a balance-independent SIM card associated with an originating VoLTE UE may have subscriber data stored in the Home Subscription Server (HSS), which assigns a Telephony Application Server (TAS) that forgoes Charging Control.

FIG. 3C is similar to FIG. 3A but depicts instead that the second user telephony device 524 is on a packet switching network. Referring to FIG. 3C, an IMS originating device (e.g., UE device 360 as the first user mobile device 520) and IMS terminating device (e.g., device 368C as the second user telephony device 524 on the packet switching network) is shown. FIG. 3C is functionally equivalent to FIG. 3A except where such labels and flows are annotated with the letter C. These C annotated flow items serve to highlight the end to end SIP signaling, since the terminating SIP signaling in block 385, no longer requires ISUP translation set forth in FIG. 3A. Upon receiving the INVITE, the Star node 365 may create a new independently signaled dialog on a SIP INVITE addressed to destination B, toward the terminating S-CSCF 366C which then may forward the INVITE to the terminating P-CSCF 367C, which in turn may forward the INVITE to the user VoLTE UE device 368C in flow item 380C.

In flow item 381C, upon receiving the INVITE, VoLTE UE device 368C may respond with a SIP 180 Ringing, which may be propagated in the backward direction to the Star node 365. In flow item 382C, upon receiving the SIP 180 Ringing indication, the Star node may transmit a SIP CANCEL message in the forward direction to VoLTE UE device 368C, which in turn may respond with a SIP 200 in the backward direction to the Star node.

It is to be understood that the SIP 487 Terminated message, following the SIP 200 message, sent from UE device 368C in the backward direction to the Star node, and the resultant SIP ACK sent by the Star node in the forward direction to the UE 368C, are omitted for clarity.

FIG. 3D is similar to FIG. 3B but depicts the second user telephony device 524 is on a packet switching network and that the first user mobile device 520 is associated with a balance-independent SIM card. Referring to FIG. 3D, one such balance-independent SIM embodiment is shown, which shares corresponding labels and flow steps with FIG. 3B as shown, with the exception of those flow items annotated with the letter D. Upon attaching to and registering with the ISM network, HSS subscriber data associated with VoLTE UE device 360 may be retrieved by S-CSCF 362. In particular, data which defines the name or address (FQDN or IP address) of the default TAS 365D, may be utilized for servicing the user associated with balance-independent UE device 360. TAS 365D of FIG. 3D may be functionally equivalent to the Star Node 365 as depicted in the FIG. 3B.

In flow item 373D, user A may dial user B through the originating VoLTE UE device 360 Thus, the UE device 360 may send an INVITE request to P-CSCF 361, which in turn may forward the INVITE request to the S-CSCF 362. Upon receiving the INVITE request, the S-CSCF 362 may forward the INVITE request to the TAS 365D associated with UE device 360 and as identified during UE attachment and registration. In this balance-independent embodiment, the S-CSCF 362 and TAS 365D elements do not require Charging Verification and Instruction. The TAS 365D may then perform the asynchronous uplink Flash Hook (Block 384) and downlink Flash Ring (Block 385) methods as described above. Some SIP messages, such as SIP ACK, may be sent by the originating UE device 360 in response to the SIP 200 received.

FIG. 3E is similar to FIG. 3D but depicts that both devices 520, 524 communicate on a synchronous zero charge telephony protocol system. Thus, in the balance-independent SIM embodiment of FIG. 3E, the Star signaling may be performed synchronously. Such synchronous signaling occurs end to end between the originating user equipment UE device 360 and the terminating user equipment UE device 368. While this embodiment depicts the UE device 368 as on VoLTE as the packet switching network, a circuit switched handset, with the required SIP:ISUP signaling translation may be similarly indicated.

Referring to FIG. 3E, the synchronous signaling embodiment is described in greater detail and shares labels and flow item steps with FIG. 3D, except where such labels and flow items are annotated with the letter E. In flow item 373E, user A may dial user B through originating VoLTE UE device 360, which may send an INVITE request to P-CSCF 361. P-CSCF 361 in turn may forward the INVITE request to S-CSCF 362. Upon receiving the INVITE request, the S-CSCF 362 may forward the INVITE to the TAS 365E associated with the UE device 360, as identified by subscriber data stored in the HSS and retrieved during UE attachment and registration.

In this balance-independent embodiment of FIG. 3E, the S-CSCF 362 and TAS 365E elements do not require Charging Verification and Instruction. The TAS 365E may then perform a synchronous uplink and downlink communications method as follows. Upon receiving the INVITE request, the TAS 365E may forward the INVITE to the terminating S-CSCF 366 associated with the device 368, which is the second mobile user device 524 on a packet switching network. The S-CSCF 366 may forward the INVITE request to the terminating P-CSCF 367, which in turn may forward the INVITE request to the VoLTE UE device 368 in flow item 380E.

In flow item 381E, upon receiving the INVITE request, the VoLTE UE device 368 may respond with a SIP 180 Ringing, which may be propagated in the backward direction to the TAS 365E. Upon receiving the SIP 180 Ringing indication, the TAS 365E may transmit the SIP 180 Ringing in the backward direction towards originating UE device 360 in flow item 374E, via S-CSCF 362 and P-CSCF 361. In this embodiment as shown, the TAS 365E, may perform a Back-to-Back-User-Agent (B2BUA) function, responding to the SIP 180 Ringing with a SIP CANCEL in the forward direction to the UE device 368 in flow item 382E, and a SIP BYE in the backward direction to UE device 360 in flow item 375E, thereby disconnecting both the originating and terminating call legs.

In flow item 376E, the originating UE device 360 may respond to the SIP BYE with a SIP 200 in the forward direction to the TAS 365E. The SIP 487 Terminating may be sent in the backward direction to TAS 365E by the terminating UE device 368 in response to the SIP CANCEL, and the resulting SIP ACK may be sent by TAS 365E in the forward direction to the UE device 368.

In some embodiments, where the MNO employs a Natural rather than a Telephony Binary Coded Decimal (BCD) Notation, the Star prefix (*) may be encoded and presented as Hexadecimal A (Hex 10, or Binary 1010), which may require the IFC triggers described above to be appropriately modified for matching. Additional STP conditions may permit Originating Unregistered INVITE Requests by enumerating an appropriate SessionCase variable (e.g.: value=3). Such an Unregistered embodiment may thus permit unauthorized users to gain access to the disclosed communication methods.

Figure 4B:
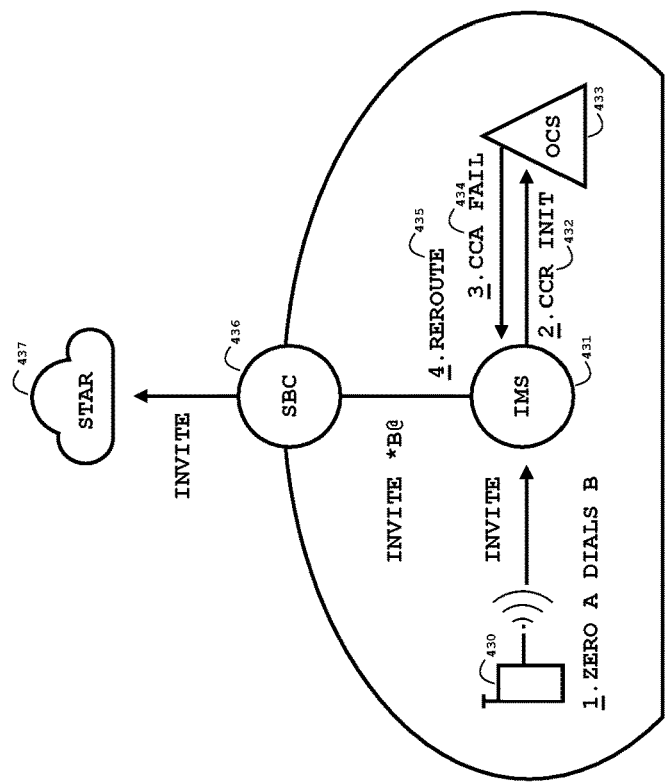
FIG. 4B schematically depicts a high level network architecture abstraction and process flow for an IMS packet switched originating device of an asynchronous zero charge telephony protocol system, according to one or more embodiments shown and described herein.
Figure 4A:
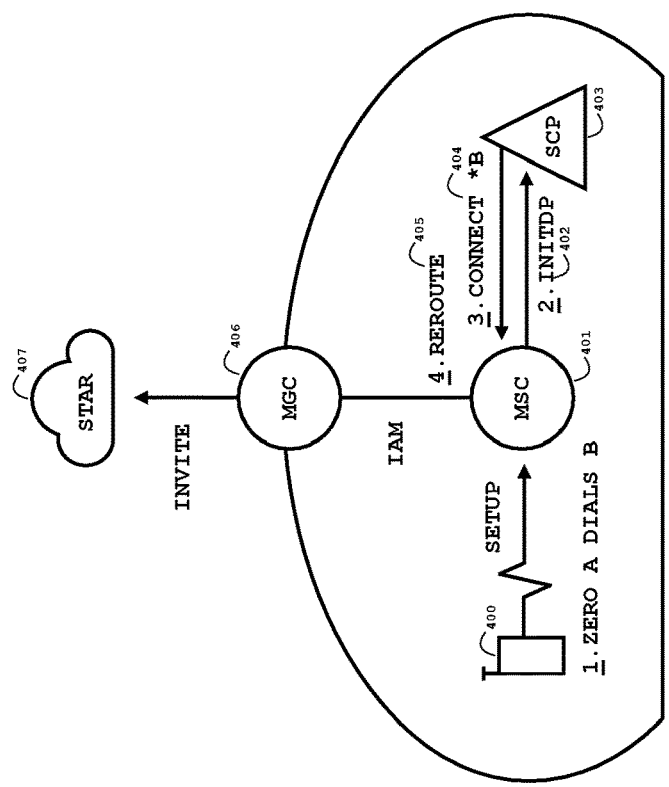
FIG. 4A schematically depicts a high level network architecture abstraction and process flow for a circuit switched originating device of an asynchronous zero charge telephony protocol system, according to one or more embodiments shown and described herein.

FIG. 4A depicts a high level network architecture abstraction and process flow for a circuit switched originating device of an asynchronous zero charge telephony protocol system, and FIG. 4B depicts a high level network architecture abstraction and process flow for an IMS packet switched originating device of an asynchronous zero charge telephony protocol system of FIGS. 1A-3C. FIGS. 1A, 1B, 3A, 3B and 4B depict an originating packet switched (4G/5G IMS/VoLTE) and a terminating circuit switched (2G/3G) call switching embodiment, rather than a Peer to Peer (IMS/VoLTE) packet switched connection as per FIG. 3C. Such dual user equipment embodiments of FIGS. 1A-3B further illustrates the interworking between the two distinctly switched network architectures.

Referring to FIGS. 4A and 4B, a high level network architecture abstraction and process flow is respectively depicted with respect to an SS7 circuit switched originating device 400 (FIG. 4A) and an IMS Packet Switched originating device 430 (FIG. 4B) as the first user mobile device 520.

FIG. 4A sets forth a circuit switched originating communication methodology similar to as described in U.S. patent application Ser. No. 16/997, 418, filed on Aug. 19, 2020, which is incorporated by reference hereinabove in its entirety. In flow Step 1 of FIG. 4A, Zero charge caller A uses Circuit Switched device 400 to dial telephone number B of the second user mobile device 524. The call Setup request may be received by a Mobile Switching Center (MSC) 401, which, upon entering a Basic Call State Model (BCSM), may encounter an Initial Detection Point (INITDP) 402.

In flow Step 2, the MSC may establish a dialog with a Service Control Point (SCP, gsmSCF) 403, for call authorization. The SCP may request credit verification from an Online Charging System (OCS) or other suitable Billing System, which may query the account associated with the device 400 of user A. Upon detecting that the account associated with the device 400 of user A has insufficient credit to complete the call, the SCP 403 may then modify the B address signals to incorporate a service routing prefix (e.g.,*, or short code such as XXX, which may include overdecadic hexadecimal signals such A,B,C,D,E).

In Flow Step 3, the SCP 403 may command the MSC 401 to CONNECT the call on the now modified address signals. This may command the MSC 401 to REROUTE the call in Flow Step 4, along a SIP trunk via a Gateway MSC (GMSC) or Media Gateway Controller (MGC) 406, and typically via an associated Session Border Controller (SBC) to the Star Switch 407. The MGC/SBC performs ISUP IAM to SIP INVITE requests signaling translation as disclosed herein.

In Flow Step 4, the MSC 401 may look up a pre-configured routing table including a trunk indicator (e.g., trunk communication path) associated with the modified address and translate/route the modified address based on the trunk indicator of the trunk associated with the modified address from the pre-configured routing table. The modified call signal may be automatically routed along the trunk from the MSC 401 to the GMSC/MGC, and then be automatically routed along the SIP trunk from the GMSC/MGC to the star signaling switch 407 as the switch component 512, as described in FIG. 5 in greater detail below.

FIG. 4B sets forth a packet switched originating communication methodology as described herein. Referring to FIG. 4B, in Flow Step 1, Packet Switched Zero charge caller A, using IMS/VoLTE UE device 430 as the first mobile user device 520, may dial telephone number B associated with the second user telephony device 524. Device 430 may transmit a SIP INVITE request, which may be received by the IMS network 431. In Flow Step 2, the IMS network 431 may perform an Initial Credit Verification by sending a Credit Control Request (CCR) 432 to Online Charging System (OCS) 433.

In Flow Step 3, the OCS 433 and associated billing nodes, for example a Session Balance Control Function (SBCF) and an Account Balance Management Function (ABMF), upon determining that the account associated with the device 430 has insufficient credit to complete the call, may return a Credit Control Answer (CCA) authorization failure 434 to the IMS network 431. In Flow Step 4, in response to receiving the CCA indicating credit authorization failure, the IMS network 431 may reroute a modified INVITE request to the Star Node 437. In an embodiment, the IMS network 431 may branch the request through a modified INVITE request incorporating a service prefix in the Request URI addressed to the Star Domain (e.g.: INVITE sip: *B@starlogik.com SIP/2.0), such as described above with reference to FIG. 3A, and via Session Border Controller SBC 436, to the Star Node 437 as the asynchronous signaling switch, which may then deliver the communication methods as disclosed herein.

While the embodiments herein recite such a rerouting (e.g., FIGS. 4A and 4B) for a call setup request on detecting an insufficient credit balance condition, other failure conditions may apply. Such failure conditions may include, without limitation, network attach failure, due to roaming authorization failure; authorization failure due to invalid service subscription; authorization failure due to Operator Determined Barring (ODB), which may bar all outgoing calls; and/or network failures due to nodes and elements, such as billing nodes (OCS) and subscription nodes (HSS), being unavailable, unreachable or unresponsive due to high network load, resulting in request time outs, or other similar failure measures.

Collectively, upon such user and/or network failure conditions, the controlling network element may perform the disclosed rerouting, transferring the unauthorized call toward the Star Node 437 or TAS to deliver remedial, rudimentary, default service utilizing the respective asynchronous or balance-independent synchronous communication methods as disclosed.

Referring to FIG. 5, a telephony protocol system 500 may be a zero charge telephony protocol system 500 for implementing a computer and software-based method to implement the zero charge telephony protocol protocols described herein is illustrated. The zero charge telephony protocol system 500 may be implemented along with using a graphical user interface (GUI) that is accessible at a mobile client device (e.g., a first user mobile device 520 and a second user telephony device 524), for example. The mobile client device may be a smart mobile device, which may be a smartphone, a tablet, or a like portable handheld smart device. The machine readable instructions may cause the zero charge telephony protocol system 500 to, when executed by the processor, interact with one or more SIM cards, or eSIMS associated with the mobile client device of the user as described herein. The machine readable instructions may cause the zero charge telephony protocol system 500 to, when executed by the processor, interact with the one or more SIM cards to follow one or more control schemes as set forth in the one or more processes described herein.

The zero charge telephony protocol system 500 includes machine readable instructions stored in non-transitory memory that cause the zero charge telephony protocol system 500 to perform one or more of instructions when executed by the one or more processors, as described in greater detail below. The zero charge telephony protocol system 500 includes a communication path 502, one or more processors 504, a memory 506, a switch component 512 that may be asynchronous or synchronous, a storage or database 514, at least one SIM component 516, a network interface hardware 518, a first user mobile device 520, a network 522, and a second user telephony device 524. The various components of the zero charge telephony protocol system 500 and the interaction thereof will be described in detail below.

In some embodiments, the zero charge telephony protocol system 500 is implemented using a wide area network (WAN) or network 522, such as an intranet or the Internet, or other wired or wireless communication network that may include a cloud computing-based network configuration. The mobile client devices 520, 524 may include digital systems and other devices permitting connection to and navigation of the network, such as the smart mobile device. Other zero charge telephony protocol system 500 variations allowing for communication between various geographically diverse components are possible. The lines depicted in FIG. 5 indicate communication rather than physical connections between the various components.

As noted above, the zero charge telephony protocol system 500 includes the communication path 502. The communication path 502 may be formed from any medium that is capable of transmitting a signal such as, for example, conductive wires, conductive traces, optical waveguides, or the like, or from a combination of mediums capable of transmitting signals. The communication path 502 communicatively couples the various components of the zero charge telephony protocol system 500. As used herein, the term "communicatively coupled" means that coupled components are capable of exchanging data signals with one another such as, for example, electrical signals via conductive medium, electromagnetic signals via air, optical signals via optical waveguides, and the like.

As noted above, the zero charge telephony protocol system 500 includes the processor 504. The processor 504 can be any device capable of executing machine readable instructions. Accordingly, the processor 504 may be a controller, an integrated circuit, a microchip, a computer, or any other computing device. The processor 504 is communicatively coupled to the other components of the zero charge telephony protocol system 500 by the communication path 502. Accordingly, the communication path 502 may communicatively couple any number of processors with one another, and allow the modules coupled to the communication path 502 to operate in a distributed computing environment. Specifically, each of the modules can operate as a node that may send and/or receive data. The processor 504 may process the input signals received from the system modules and/or extract information from such signals.

As noted above, the zero charge telephony protocol system 500 includes the memory 506, which is coupled to the communication path 502, and communicatively coupled to the processor 504. The memory 506 may be a non-transitory computer readable medium or non-transitory computer readable memory and may be configured as a nonvolatile computer readable medium. The memory 506 may comprise RAM, ROM, flash memories, hard drives, or any device capable of storing machine readable instructions such that the machine readable instructions can be accessed and executed by the processor 504. The machine readable instructions may comprise logic or algorithm(s) written in any programming language such as, for example, machine language that may be directly executed by the processor, or assembly language, object-oriented programming (OOP), scripting languages, microcode, etc., that may be compiled or assembled into machine readable instructions and stored on the memory 506. Alternatively, the machine readable instructions may be written in a hardware description language (HDL), such as logic implemented via either a field-programmable gate array (FPGA) configuration or an application-specific integrated circuit (ASIC), or their equivalents. Accordingly, the methods described herein may be implemented in any computer programming language, as pre-programmed hardware elements, or as a combination of hardware and software components. In embodiments, the zero charge telephony protocol system 500 may include the processor 504 communicatively coupled to the memory 506 that stores instructions that, when executed by the processor 504, cause the processor to perform one or more functions as described herein.

Still referring to FIG. 5, as noted above, the zero charge telephony protocol system 500 may comprise the display such as a GUI on a respective screen of the mobile client devices 520, 524 for providing visual output and/or receiving input such as a dialed number on a touchscreen interface. The mobile client devices 520, 524 may include one or more computing devices across platforms, or may be communicatively coupled to devices across platforms, such as smart mobile devices including smartphones, tablets, laptops, and the like. The display on the screen of the mobile client devices 520, 524 is coupled to the communication path 502 and communicatively coupled to the processor 504. Accordingly, the communication path 502 communicatively couples the display to other modules of the zero charge telephony protocol system 500. The display can include any medium capable of transmitting an optical output such as, for example, a cathode ray tube, light emitting diodes, a liquid crystal display, a plasma display, or the like. Additionally, it is noted that the display or the mobile client devices 520, 524 can be communicatively coupled to at least one of the processor 504 and the memory 506. While the zero charge telephony protocol system 500 is illustrated as a single, integrated system in FIG. 5, in other embodiments, the systems can be independent systems and/or sub-systems.

The zero charge telephony protocol system 500 may comprise: (i) the switch component 512, which may be asynchronous as the Star Switch 305, 335 as described herein and (ii) the at least one SIM component 516, which may be a prepaid SIM card and/or a balance-independent SIM card as described herein and/or an eSIM equivalent. The at least one SIM component 516 may at least one subscriber identity module (SIM) card, which comprises an integrated circuit that securely stores an international mobile subscriber identity (IMSI) number and related key information used to identify and authenticate subscribers of smart mobile telephony devices. Each SIM card may also store contact information and its own unique serial number as an integrated circuit card identifier (ICCID), the IMSI number, security authentication and ciphering information, local network related temporary information, a list of accessible user services, a user password as a personal identification number (PIN), and a personal unblocking code to unlock the PIN. A card services provider may be able to identify and authenticate a SIM card to provide services, such as cellular and/or wireless data services to a device within which the SIM card is installed. The switch component 512 and the at least one SIM component 516 are coupled to the communication path 502 and communicatively coupled to the processor 504. The processor 504 may process the input signals received from the system modules and/or extract information from such signals.

Data stored and manipulated in the zero charge telephony protocol system 500 as described herein may be used to leverage a cloud computing-based network configuration such as the Cloud (e.g., a cloud server in a cloud network configuration utilizing cloud computing). The zero charge telephony protocol system 500 includes the network interface hardware 518 for communicatively coupling the zero charge telephony protocol system 500 with a computer network such as network 522, which may comprise an IMS/VoLTE architecture, the Cloud, and the like. The network interface hardware 518 is coupled to the communication path 502 such that the communication path 502 communicatively couples the network interface hardware 518 to other modules of the zero charge telephony protocol system 500. The network interface hardware 518 can be any device capable of transmitting and/or receiving data via a wireless network. Accordingly, the network interface hardware 518 can include a communication transceiver for sending and/or receiving data according to any wireless communication standard. For example, the network interface hardware 518 can include a chipset (e.g., antenna, processors, machine readable instructions, etc.) to communicate over wired and/or wireless computer networks such as, for example, wireless fidelity (Wi-Fi), WiMax, Bluetooth, IrDA, Wireless USB, Z-Wave, ZigBee, or the like.

Still referring to FIG. 5, data from various applications running on mobile client devices 520, 524, including data associated with the at least one SIM component 516 communicatively coupled to the mobile client devices 520, 524, can be provided to the zero charge telephony protocol system 500 via the network interface hardware 518. The mobile client devices 520, 524 can be any device having hardware (e.g., chipsets, processors, memory, etc.) for communicatively coupling with the network interface hardware 518 and a network 522. Specifically, the mobile client device 520, 524 can include an input device having an antenna for communicating over one or more of the wireless computer networks described above.

The network 522 can include any wired and/or wireless network such as, for example, IMS/VoLTE, wide area networks, metropolitan area networks, the Internet, an Intranet, the Cloud, satellite networks, or the like. Accordingly, the network 522 can be utilized as a wireless access point and/or for packet switching via an IMS/VoLTE by the mobile client devices 520, 524 to access one or more servers (e.g., of the Cloud). Accessed servers, such as a cloud server, generally include processors, memory, and chipset for delivering resources via the network 522. Resources can include providing, for example, processing, storage, software, and information from the one or more servers to the zero charge telephony protocol system 500 via the network 522. Additionally, it is noted that the one or more servers can share resources with one another over the network 522 such as, for example, via the wired portion of the network 522, the wireless portion of the network 522, or combinations thereof.

In embodiments, the zero charge telephony protocol system 500 and associated methods may include one or more processors 504, a non-transitory memory 506 communicatively coupled to the one or more processors 504, and machine readable instructions. The machine readable instructions are stored in the non-transitory memory 506 and cause the system 500 to automatically perform protocols, methodologies, and control schemes such as those set forth herein with respect to FIGS. 1A-4B when executed by the one or more processors 504.

In embodiments corresponding to FIGS. 1A-3D with protocols and methods as described herein, the zero charge telephony protocol system 500 may, for example, be operable to receive, from a first user mobile device 520 on a packet switched network and associated with a first user account, a call signal comprising a request to place and complete a call to a telephony address of a second user telephony device 524, and to automatically modify the telephony address with a distinguishing service code prefix and an asynchronous signaling switch destination address to generate a modified call signal comprising a modified address, including the distinguishing service code prefix and the asynchronous signaling switch destination address, when the first user account has insufficient balance to complete the call (such as in FIGS. 1A-3B) or is independent of balance (such as in FIGS. 3C or 3D).

In embodiments, the system 500 may be operable to automatically modify the telephony address with the distinguishing service code prefix and the asynchronous signaling switch destination address to generate the modified call signal comprising the modified address when the network exception prevents completion of the call to the second user telephony device 524. The network exception may occur based on one or more software failures, hardware failures, routing and protocol failures, authentication failures, failures in authentication, authorization, and accounting (AAA) with respect to protocols mediating network access, or combinations thereof. Network protocols that provide AAA functionality may include a Remote Authentication Dial-In User Services (RADIUS) protocol, a Diameter protocol, or other suitable network protocols to provide AAA functionality to mediate network access. The Diameter protocol evolved from the RADIUS protocol, is an AAA protocol for computer networks, and belongs to the application layer protocols in an internet protocol suite. Such protocols may be those defined by the Internet Engineering Task Force (IETF) in Requests for Comment (RFC) 6733, RFC 3588, or the like, to define a core state machine for maintaining connections between peers and processing messages. In embodiments, AAA servers communication via a network protocol, such as the RADIUS protocol or the Diameter protocol.

The network exception may occur when the first user account associated with the first user mobile device 520 undergoes a credit verification by a network element, and the network element fails to respond to the credit verification or responds with a negative verification. In embodiments, the network element may be a network router that fails upon system overload, exceeding a database threshold, a network distress, a node failure, central processing unit (CPU) overload issue, or the like. Further, the network exception may occur the first user account fails an authorization upon device registration of the first user mobile device 520, upon connection or attachment to the packet switched network, or combinations thereof. Such an authorization failure would otherwise prevent the first user account from being granted permission to be connected to the packet switched network such that the first user account would not be able to login to the packet switched network.

In one authorization failure embodiment, the network may record an unauthorized exception flag in the Home Subscriber System (HSS), which may then activate the disclosed exception hander logic on receiving a request from the unauthorized device to place the call. Such a flagged exception handler embodiment may thus permit unauthorized users to roam onto available networks, on which otherwise they would not be granted access.

The system 500 may further be operable to route the modified call signal, via the packet switched network, to an asynchronous signaling switch (e.g., the switch component 512) based on the asynchronous signaling switch destination address associated with the modified address, revert the modified call signal at the asynchronous signaling switch to the call signal, deliver the call signal from the asynchronous signaling switch to the second user telephony device 524 to complete the call, and automatically disconnect the call from the second user telephony device 524 upon receipt (or answer) of the call signal by the second user telephony device 524.

In embodiments, the system 500 may be operable to disconnect the call from the first user mobile device 520 by the asynchronous signaling switch play a ring-back-tone as a return call to the first user mobile device 520 by the asynchronous signaling switch, or combinations thereof. The system 500 may be operable to transmit a return call to the first user mobile device 520 by the asynchronous signaling switch, answer the return call by the first user mobile device 520, automatically disconnect the return call from the first user mobile device 520 after a period of time, generate a call data record of the return call based on the period of time. As a non-limiting example, the system 520 may disconnect the call from the first user mobile device 520 when the first user account has insufficient balance to complete the call in concurrence to routing the call signal to the second user telephony device 524, track the call between the first user mobile device 520, the asynchronous signaling switch, and the second user telephony device 524 with a plurality of call data recording codes associated with the call within a period of time, and charge a second user account of the second user telephony device 524 based on the plurality of call data recording codes associated with the call upon a callback from the second user telephony device 524 to the first user mobile device 500 within the period of time.

Additionally or alternatively, the system 500 may be operable to deliver the call signal from the from the asynchronous signaling switch to the second user telephony device 524 along with an identification delivery configured to identify the first user mobile device 520, a ringing permission, and an answering restriction. The system 500 may further be operable to automatically disconnect the call from the second user telephony device 524 based on receipt by the second user telephony device 524 of the identification delivery, the ringing permission, and the answering restriction. The system 500 may be operable to automatically modify the telephony address with the distinguishing service code prefix including a star symbol (e.g., *) to generate the modified call request comprising the modified address including the star symbol as the distinguishing service code prefix when the first user account has insufficient balance to complete the call.

The first user account may be associated with a balance-dependent subscriber SIM card and a balance-independent SIM card. The balance-dependent SIM card may be configured to include balance to place and complete the call and incur a charge through a balance-dependent service key invoking a balance-dependent logic when the first user account has sufficient balance to complete the call. The balance-independent SIM card is configured to place and complete a different call to the second user telephony device 524 without charge through a balance-independent service key invoking a no-charge logic separate from the balance-dependent logic when the first user account has insufficient balance to complete the call.

Alternatively, the first user account may be associated with a balance-independent subscriber identification module (SIM) card such that the first user account is configured to place and complete the call via the balance-independent SIM card, independent of balance. The system 500 may further be operable to receive a payment in the first user account, and modify the balance-independent SIM card into a balance-dependent SIM card having a positive balance sufficient to place and complete a call.

In embodiments corresponding to FIGS. 1B-2 and 3B, when the first user account has insufficient balance to complete the call or is independent of balance, the system 500 may further be operable to transmit instructions to send the modified call signal comprising the modified address back to the first user mobile device 520, receive, from the first user mobile device on the packet switched network, the modified call signal comprising the modified address, and route the modified call signal from the first user mobile device 520, via the packet switched network, to the asynchronous signaling switch.

In synchronous embodiments corresponding to FIG. 3E, and which may include aspects of FIGS. 3B and 3D, the zero charge telephony protocol system 500 may, for example, be operable to receive, from the first user mobile device 520 on the packet switched network and associated with a first user account, a call signal comprising a request to place and complete a call to a telephony address of the second user telephony device 524, wherein the first user mobile device 520 is associated with a balance-independent SIM card. The first user account may be associated with the balance-independent SIM card configured to include a balance to place and complete the call, and the packet switched network may be an IMS VoLTE network. The system 500 may further be operable to automatically set a duration time quota upon a charging onset when the first user account has insufficient balance to complete the call and based on using the balance-independent SIM card, deliver the call signal to the second user telephony device 524 to complete the call, and automatically disconnect the call from the second user telephony device 524 when the call signal is delivered or when the duration time quota is exceeded after the charging onset is encountered. Setting such a short duration quota to substantially immediately expire on encountering a charging onset thus permits the call to progress to signaling completion while simultaneously preventing the call from being answered and progressing to bidirectional speech. In one embodiment, the call duration time quota may be 0 to 1 second from the charging onset. When the first user account has sufficient balance on the balance-independent SIM card to complete the call, the system 500 may continue to place the call and permit the call to proceed to speech post answering by the second user telephony device 524 and based on the sufficient balance.

In other embodiments, the system 500 may include a network exception handler including logic to handle a network exception. The system 500 may be operable to receive, from a first user mobile device 520 on a packet switched network and associated with a first user account, a call signal comprising a request to place and complete a call to a telephony address of a second user telephony device 524, wherein the first user mobile device 520 is associated with a balance-independent subscriber identification module (SIM) card, and automatically set a duration time quota upon a charging onset when the network exception prevents completion of the call to the second user telephony device 524 and based on using the balance-independent SIM card. The system 500 may then be further operable to deliver the call signal to the second user telephony device 524 to complete the call, and automatically disconnect the call from the second user telephony device 524 when the call signal has been delivered or when the duration time quota is exceeded after the charging onset.

It is noted that recitations herein of a component of the present disclosure being "configured" or "programmed" in a particular way, to embody a particular property, or to function in a particular manner, are structural recitations, as opposed to recitations of intended use. More specifically, the references herein to the manner in which a component is "configured" or "programmed" denotes an existing physical condition of the component and, as such, is to be taken as a definite recitation of the structural characteristics of the component.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A telephony protocol system comprising:
one or more processors;
a non-transitory memory that is communicatively coupled to the one or more processors and comprises machine readable instructions that cause the telephony protocol system to perform at least the following when executed by the one or more processors:
receive, from a first user mobile device that is on a packet switched network and associated with a first user account, a call request to complete a call to a second user telephony device, wherein the first user account is associated with a balance-independent subscriber identification module (SIM) card disposed in the first user mobile device such that the first user mobile device is configured to complete the call, via the balance-independent SIM card, independent of balance;
receive a payment credit in the first user account;
modify the balance-independent SIM card into a balance-dependent SIM card having a positive balance sufficient to complete the call;
automatically modify, when a network exception occurs that causes to prevent a completion of the call to the second user telephony device via a particular signaling switch, header data of the call request to identify an alternate signaling switch, so to generate a modified call request comprising a modified header data, wherein, via the modified call request, the first user mobile device is permitted to transmit the call request to complete the call when the balance-dependent SIM card has the positive balance sufficient to complete the call, wherein the network exception occurs when at least one of:
the first user account associated with the first user mobile device undergoes a credit verification by a network element, and the network element fails to respond to the credit verification or responds with a negative verification; or
the first user account fails an authorization upon a device registration of the first user mobile device, upon connection or attachment to the packet switched network, or combinations thereof;
wherein the header data is modified to generate the modified header data of the modified call request by modifying the header data to incorporate a combination of a service code prefix identifying the alternate signaling switch and a representation correlated with a telephony address of the second user telephony device; and
transmit the modified call request, via the packet switched network, to the alternate-signaling switch based on the modified header data.

2. The telephony protocol system of claim 1, further comprising machine readable instructions that cause the system to perform at least the following when executed by the one or more processors:
automatically set a duration time quota when the network exception prevents completion of the call to the second user telephony device and based on using the balance-independent SIM card.

3. The telephony protocol system of claim 1, further comprising machine readable instructions that cause the system to perform at least the following when executed by the one or more processors:
transmit instructions to redirect the call back to the first user mobile device.

4. The telephony protocol system of claim 1, wherein the machine readable instructions further cause the system to perform at least the following when executed by the one or more processors:
automatically disconnect the call from the first user mobile device by the alternate signaling switch.

5. The telephony protocol system of claim 1, wherein the machine readable instructions further cause the system to perform at least the following when executed by the one or more processors:

play a ring-back-tone to the first user mobile device by the alternate signaling switch.

6. The telephony protocol system of claim 1, wherein the machine readable instructions further cause the system to perform at least the following when executed by the one or more processors:

automatically modify the telephony address to generate the modified call request by modifying address signals associated with the telephony address, and deliver the call signal from the alternate signaling switch by reverting the modified address signals to the call.

7. The telephony protocol system of claim 1, wherein the network exception occurs based on one or more software failures, hardware failures, routing and protocol failures, authentication failures, failures in authentication, authorization, and accounting with respect to protocols mediating network access, or combinations thereof.

8. A method comprising:

receiving, from a first user mobile device that is on a packet switched network and associated with a first user account, a call request to complete a call to a second user telephony device, wherein the first user account is associated with a balance-independent subscriber identification module (SIM) card disposed in the first user mobile device such that the first user mobile device is configured to complete the call, via the balance-independent SIM card, independent of balance;

receive a payment credit in the first user account;

modify the balance-independent SIM card into a balance-dependent SIM card having a positive balance sufficient to complete the call;

automatically modifying, when a network exception occurs that causes to prevent a completion of the call to the second user telephony device via a particular signaling switch, header data of the call request to identify an alternate signaling switch, so to generate a modified call request comprising a modified header data, wherein, via the modified call request, the first user mobile device is permitted to transmit the call request to complete the call when the balance-dependent SIM card has the positive balance sufficient to complete the call, wherein the network exception occurs when at least one of:

the first user account associated with the first user mobile device undergoes a credit verification by a network element, and the network element fails to respond to the credit verification or responds with a negative verification; or the first user account fails an authorization upon a device registration of the first user mobile device, upon connection or attachment to the packet switched network, or combinations thereof;

wherein the header data is modified to generate the modified header data of the modified call request by modifying the header data to incorporate a combination of a service code prefix identifying the alternate signaling switch and a representation correlated with a telephony address of the second user telephony device; and transmitting the modified call request, via the packet switched network, to the alternate signaling switch based on the modified header data.

9. The method of claim 8, wherein the network exception prevents completion of the call to the second user telephony device, and via the modified call request servicing a call setup request by the alternate signaling switch.

10. The method of claim 8, further comprising:

transmitting instructions to send the call back to the first user mobile device; and transmitting the modified call request from the first user mobile device on the packet switched network to the alternate signaling switch.

11. The method of claim 8, further comprising:

automatically disconnecting the call from the first user mobile device by the alternate signaling switch.

12. The method of claim 8, further comprising:

playing a ring-back-tone to the first user mobile device by the alternate signaling switch.

13. The method of claim 8, further comprising machine readable instructions that cause the system to perform at least the following when executed by the one or more processors:

automatically set a duration time quota when the network exception prevents completion of the call to the second user telephony device and based on using the balance-independent SIM card.

* * * * *